US011354662B2

(12) United States Patent
Sweet

(10) Patent No.: US 11,354,662 B2
(45) Date of Patent: Jun. 7, 2022

(54) SYSTEM AND METHOD FOR IMPLEMENTING A PAYMENT ARCHITECTURE THAT PROVIDES INSTANT, RISK-FREE PAYMENT IN DIGITAL CASH

(71) Applicant: Lawrence Mark Sweet, Brooklyn, NY (US)

(72) Inventor: Lawrence Mark Sweet, Brooklyn, NY (US)

(73) Assignee: Izzi, Inc., Brooklyn, NY (US)

( * ) Notice: Subject to any disclaimer, the term of this patent is extended or adjusted under 35 U.S.C. 154(b) by 0 days.

(21) Appl. No.: 17/173,202

(22) Filed: Feb. 10, 2021

(65) Prior Publication Data
US 2021/0248602 A1  Aug. 12, 2021

Related U.S. Application Data

(60) Provisional application No. 62/972,108, filed on Feb. 10, 2020.

(51) Int. Cl.
| G06Q 20/38 | (2012.01) |
| G06Q 40/04 | (2012.01) |
| G06Q 20/06 | (2012.01) |

(52) U.S. Cl.
CPC ....... *G06Q 20/389* (2013.01); *G06Q 20/0658* (2013.01); *G06Q 40/04* (2013.01)

(58) Field of Classification Search
CPC ... G06Q 20/389; G06Q 40/04; G06Q 20/0658
See application file for complete search history.

(56) References Cited

U.S. PATENT DOCUMENTS

| 8,386,352 | B1 * | 2/2013 | Bhatt ............. | G06Q 40/02 |
| | | | | 705/35 |
| 2005/0234820 | A1 * | 10/2005 | MacKouse ........... | G06Q 30/04 |
| | | | | 705/40 |

(Continued)

FOREIGN PATENT DOCUMENTS

| CN | 105427098 | * | 3/2016 | ............. | G06Q 20/36 |
| WO | WO-0022556 A1 | * | 4/2000 | ............. | G06Q 20/04 |
| WO | WO-2013173515 A2 | * | 11/2013 | ............. | G06Q 40/04 |
| WO | WO-2017090041 A1 | * | 6/2017 | ............. | G06F 21/64 |

OTHER PUBLICATIONS

Dyson et al.: Digital Cash: Why Central Banks should start issuing electronic money, 2016, Positive Money, pp. 1-44 (Year: 2016).*

(Continued)

*Primary Examiner* — Bijendra K Shrestha
(74) *Attorney, Agent, or Firm* — Hunton Andrews Kurth LLP

(57) ABSTRACT

An embodiment of the present invention is directed to a system utilizing a new form of digital cash held by users in deposit accounts with banks, backed by central bank liquidity and recorded on a centralized ledger, for making payment, in a single currency or cross-currency. An embodiment of the present invention simultaneously, instantly and finally makes the corresponding adjustments to the assets and liabilities of all banks in the correspondent chain on the ledger between the payer and payee for a payment in a single currency. For cross-currency payments, an embodiment of the present invention provides competitive rates from foreign exchange traders; settles the payment and the associated foreign exchange transaction in a new form of integrated tri-party transaction which is instant and legally final for the payer, payee and foreign exchange trader; and simultaneously, instantly and finally makes corresponding adjustments to the ledger for all associated parties.

20 Claims, 29 Drawing Sheets

(56) References Cited

U.S. PATENT DOCUMENTS

| | | | | |
|---|---|---|---|---|
| 2007/0168279 | A1* | 7/2007 | D'Angelo | G06Q 40/025 |
| | | | | 705/39 |
| 2009/0138398 | A1* | 5/2009 | Cole | G06Q 40/025 |
| | | | | 705/42 |
| 2015/0278813 | A1* | 10/2015 | Yue | G06Q 20/389 |
| | | | | 705/44 |
| 2016/0224949 | A1* | 8/2016 | Thomas | G06Q 20/027 |
| 2016/0314530 | A1* | 10/2016 | Blank | G06Q 40/04 |
| 2017/0330250 | A1* | 11/2017 | Arjomand | G06Q 20/0658 |
| 2019/0102756 | A1* | 4/2019 | Zhou | G06K 7/1413 |
| 2019/0172059 | A1* | 6/2019 | Castagna | G06Q 20/389 |
| 2020/0042996 | A1 | 2/2020 | Mayblum et al. | |
| 2021/0174319 | A1* | 6/2021 | Kellman | G06Q 40/10 |

OTHER PUBLICATIONS

Dyson et al.: Digital Cash—Why Central Bank Should Start Issuig Electronic Money, 2016, Positive Money, pp. 1-44 (Year: 2014 ).*

Bank for International Settlements: Central Bank Digital Currencies, Mar. 2018, Committee on Payment and Market Infrastructure, Market Committee, pp. 1-34 (Year: 2018).*

Cooper et al.: The benefits and potential risk of digital fiat currencies, Jun. 2018, Center for Financial Regulation & Inclusion (cenfri) , pp. 1-25 (Year: 2018).*

International Searching Authority, PCT International Search Report and Written Opinion, International Application No. PCT/US21/17516, dated Apr. 22, 2021, pp. 1-15.

* cited by examiner

Federal Reserve Bank 110

| Liabilities | | |
|---|---|---|
| Individual 112 master accounts: | | |
| • Bank 1: | $ | |
| • Bank 2: | $ | |
| • Bank 3: | $ | |
| Joint Accounts: 114 | | |
| • Held by e-cash funding banks (Bank 1, Bank 2, & Bank 3): | | $ |
| • Held by CHIPS funding bank: | | $ |
| • Held by RTP funding banks | | $ |

USD e-cash ledger 120

| | | |
|---|---|---|
| Total e-cash issued: | | $ |
| Bank 1 total: | | $ |
| -o.w. Bank 1 prop: | $ | |
| -o.w. EU-A: | $ | |
| Bank 2 total: | | $ |
| -o.w. Bank 2 prop: | $ | |
| -o.w. EU-B: | $ | |
| -o.w. Bank 4 total: | | $ |
| -o.w. Bank 4 prop: | $ | |
| -o.w. EU-D: | $ | |
| Bank 3 total: | | $ |
| -o.w. Bank 3 prop: | $ | |
| -o.w. EU-C: | $ | |

Bank 1

| Assets | | Liabilities | |
|---|---|---|---|
| Total e-cash: | $ | *EU-A DDAs* | |
| - prop: | $ | • Checking: | $ |
| -EU-A: | $ | • e-cash: | $ |

Bank 2

| Assets | | Liabilities | |
|---|---|---|---|
| Total e-cash: | $ | *EU-B DDAs* | |
| - prop: | $ | • Checking: | $ |
| - EU-B: | $ | • e-cash: | $ |
| - Bank 4: | $ | Bank 4 DDA: | |
| -- prop: | $ | • Vostro: | $ |
| -- EU-D: | $ | • e-cash: | $ |

Bank 3

| Assets | | Liabilities | |
|---|---|---|---|
| Total e-cash: | $ | *EU-C DDAs* | |
| - prop: | $ | • Checking: | $ |
| - EU-C: | $ | • e-cash: | $ |

Bank 4

| Assets | | Liabilities | |
|---|---|---|---|
| Bank 2 e-cash DDA: | $ | *EU-D DDAs* | |
| -prop: | $ | • Checking: | $ |
| -EU-D: | $ | • e-cash: | $ |

EU-A's e-cash digital wallet 130

EU-B's e-cash digital wallet 132

EU-C's e-cash digital wallet 134

EU-D's e-cash digital wallet 136

Figure 1A

SYSTEM AND METHOD FOR IMPLEMENTING A PAYMENT ARCHITECTURE THAT PROVIDES INSTANT, RISK-FREE PAYMENT IN DIGITAL CASH

CROSS REFERENCE TO RELATED APPLICATIONS

The application claims priority to U.S. Provisional Application 62/972,108, filed Feb. 10, 2020, the contents of which are incorporated herein in their entirety.

FIELD OF THE INVENTION

The present invention relates generally to an innovative payment system and more specifically to a payment architecture that provides instant, risk-free payment in digital cash.

BACKGROUND OF THE INVENTION

Current payment methods are often slow, complex, fragmented, inaccessible and expensive. Even retail payment methods that appear instant to the end-user rely on credit and liquidity intermediation provided by banks and/or long correspondent banking chains that are slow, expensive and subject to operational, credit and other risks.

Most proposed models displace banks and infrastructures but do not have a credible substitute for: established networks—the global banking and payment provider network is ubiquitous; experienced participants—banks, payment providers and infrastructures have vast experience and insight; customer relationships and customer fairness obligations; regulation and supervision—to an exceptionally high standard; resilient operators—established, practiced technology and operations; and deposit protection—in most countries, insurance protects customers. Models without these elements create risks for customers, as well as a risk of de-banking and other macro-economic consequences, with uncertain accountability for the consequences.

These and other drawbacks exist.

SUMMARY OF THE INVENTION

According to an embodiment of the present invention, a system that implements a payment architecture that provides instant, risk-free payment in digital cash. The system comprises: a central bank interface that communicates via a communication network with a central bank and manages a funding account per currency held by one or more funding banks; a digital cash ledger that is stored in a memory component and comprises a data structure, the digital cash ledger reflects a plurality of digital cash accounts in a currency and a plurality of balances and transactions in a digital currency, wherein the data structure reflects how each account uniquely links to a funding bank that represents a correspondent chain; a computer processor that is programed to manage a funding account and execute a ledger operator module that ensures alignment between the funding account and the digital cash ledger, and further effects transactions and adjustments on the digital cash ledger; the computer processor is further programmed to perform the steps of: electronically receiving a transaction request from a payer to a payee; verifying an available balance in a payer account of the payer for the transaction request prior to making a payment pursuant to the transaction request; checking an instruction associated with the transaction request against one or more predetermined limits; and automatically and simultaneously adjusting the digital cash ledger for at least the payer and the payee in a correspondent chain associated with the transaction request, so that a total of digital currency accounts is equal to a current amount of digital cash on the digital cash ledger and a current balance in the funding account.

According to an embodiment of the present invention, a method that implements a payment architecture that provides instant, risk-free payment in digital cash. The method comprises the steps of: communicating, via a central bank interface and a communication network, with a central bank to manage a funding account per currency held by one or more funding banks; storing, via a memory component, a digital cash ledger that comprises a data structure, the digital cash ledger reflects a plurality of digital cash accounts in a currency and a plurality of balances and transactions in a digital currency, wherein the data structure reflects how each account uniquely links to a funding bank that represents a correspondent chain; managing, via a computer processor, a funding account and executing, via the computer processor, a ledger operator module that ensures alignment between the funding account and the digital cash ledger, and further effects transactions and adjustments on the digital cash ledger; electronically receiving a transaction request from a payer to a payee; verifying an available balance in a payer account of the payer for the transaction request prior to making a payment pursuant to the transaction request; checking an instruction associated with the transaction request against one or more predetermined limits; and automatically and simultaneously adjusting the digital cash ledger for at least the payer and the payee in a correspondent chain associated with the transaction request, so that a total of digital currency accounts is equal to a current amount of digital cash on the digital cash ledger and a current balance in the funding account.

An embodiment of the present invention is directed to an innovative payment system that realizes the potential of digital money and preserves the elements of existing market structure that promote a stable, safe and accessible financial market. An embodiment of the present invention works for customers, banks and central banks and regulators.

For customers, an embodiment of the present invention provides an easy deposit account to open and add. Customers will have deposit insurance in their country. Customers will not be trusting their money to an unregulated system with limited recourse. Instead, through an embodiment of the present invention, they will have all the protections they current have with bank deposit accounts.

For banks, an embodiment of the present invention maintains customers and deposits without losing space to other providers. Banks may further leverage their existing network and do not need new relationships. Technology development may be largely focused on connectivity rather than integrating an entirely new technology. An embodiment of the present invention may scale to retail and wholesale. For non-bank payment service providers, an embodiment of the present invention allows them to access and to provide instant, risk-free payment in digital cash to their customers.

For central banks and regulators, an embodiment of the present invention may provide control and visibility over size, variability and reserve impact to their currency. Providers may be regulated and supervised (without having to invent entirely new regimes) and will have expertise and experience. Each currency ledger Operator may operate independently according to the standards the relevant central bank deems appropriate to it. The currency ledger Operators and foreign exchange market (FX) Operator may operate at the standards appropriate to systemic responsibility. The system may further promote financial inclusion in a safe way that protects customers.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIGS. 1A-1G are exemplary system diagrams that illustrates core elements of e-cash, according to an embodiment of the present invention.

DETAILED DESCRIPTION OF THE PREFERRED EMBODIMENT(S)

Figure 1B:
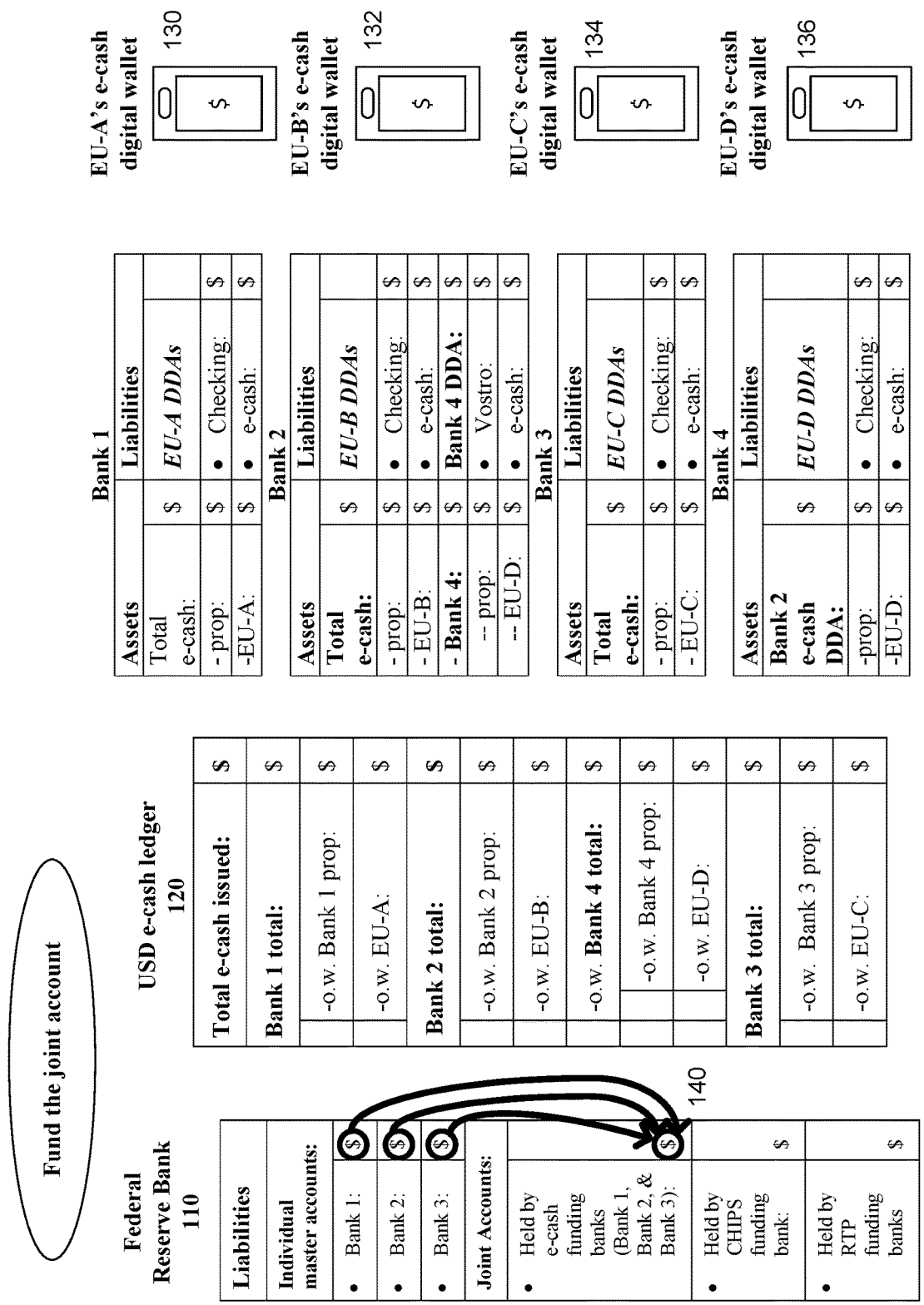

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a payment system that provides instant, risk-free payment in digital cash. An embodiment of the present invention is directed to a form of digital money (referred to as e-cash), backed by central bank liquidity. It may be created by Funding Banks which transfer central bank account balances to an e-cash Funding Account operated by an Operator on their behalf and always available (24×7). Each Funding Bank may distribute e-cash to other banks, payment providers and end-users, using existing or new correspondent banking networks.

An embodiment of the present invention provides an easy, ubiquitous and safe way to make payments. For example, end users may hold e-cash in a new type of deposit account at any bank or payment service provider that links directly or indirectly to a Funding Bank and may further pay any other end-user with an e-cash account in any currency at any time, instantly and with certainty. An end-user may view and use e-cash as "digital money" held in a digital "wallet"—a new form of deposit-protected account with its bank.

With an embodiment of the present invention, payment is instant, final and efficient. An e-cash account may be linked to an Operator, who controls payments and balances, ensuring simultaneous, final settlement for banks, non-bank payment service providers and end users in the banking relationship "chain." It does not only appear instant to the end user—everyone in the chain is instantly and finally whole. An embodiment of the present invention may further include an innovative FX mechanism, providing competitive rates and instant execution and settlement of a new integrated tri-party transaction between the payer, payee and an FX trader to effect a cross-currency payment.

According to an embodiment of the present invention, an "e-cash account" may represent a new commercial bank deposit with 24×7 instant liquidity fully backed by central bank money. According to an embodiment of the present invention, "e-cash" may refer to an innovative process for creating, funding, holding, and defunding balances in the "e-cash account." An embodiment of the present invention may provide single currency payments as well as cross-currency payments. Single currency payments with "e-cash" may involve an innovative process to pay and/or transfer money instantly 24×7 in any single currency, domestically or cross-border. Cross-currency payments with "e-cash" may involve an innovative integrated process to price, to trade, and to pay/transfer instantly 24×7 in any other currency, domestically or cross-border.

According to an embodiment of the present invention, e-cash may be represented as including a commercial bank component and a central bank component. The commercial bank component may interface with the customer and further guarantee the instant 24×7 liquidity and safety of e-cash as well as run and govern the system.

The central bank component may "back" the liquidity guarantee with pre-funded central bank balances; "back" the safety guarantee with supervision, intraday and overnight credit, and deposit insurance (e.g., the traditional banking "safety net"); and further enable the system to "run" on instant 24×7 interbank settlement.

According to an embodiment of the present invention, for each currency, an e-cash ledger Operator may be chosen or created to perform operations on a currency ledger for various users of e-cash and to operate a Funding Account for that currency on behalf of Funding Banks. The Operator may develop an initial Rulebook (or set of rules) in consultation and coordination with a central bank and prospective Funding Banks. The Rulebook may represent the basis for finality for e-cash payments in the currency. Funding Banks (with central bank accounts) may collectively establish a Funding Account at the central bank (or an entity authorized by the central bank), operated by the Operator on their behalf, and may sign up to the Rulebook. The operator may have sole responsibility and authority to amend the Rulebook at any time as it sees fit, and as may be required by the central bank or the Operator's supervisor.

An embodiment of the present invention is directed to creating and crediting e-cash. Each Funding Bank may transfer funds from its proprietary central bank account to a Funding Account and an Operator may credit the Funding Bank on an e-cash ledger with a corresponding amount of e-cash. A depositor at a Funding Bank (e.g., an end-user or a non-funding bank (NFB)) may convert its balance in a traditional demand deposit (e.g., its balance in a traditional checking or savings account) to e-cash at any time (within predetermined limits set by the Funding Bank) provided the Funding Bank has sufficient available e-cash. In accordance with the various embodiments of the present invention, all references to NFBs apply equally to PSPs. In turn, depositors at an NFB may do the same. Each e-cash account may ultimately link to a Funding Bank and each e-cash account balance may be ultimately derived from an e-cash balance held by a Funding Bank, backed by a deposit in the Funding Account. In this way, e-cash liquidity may be backed by central bank funds.

According to an embodiment of the present invention, all e-cash accounts may be reflected on an Operator's ledger. Balances may be recorded there and any changes in account balance, when normal money is converted into e-cash (or e-cash is converted back) or when e-cash is paid or received, are effected on the ledger. Critically, whenever a conversion or payment is made, the Operator may simultaneously adjust the balances not only of the party converting, paying or receiving e-cash, but of each entity in the "chain" to the Funding Bank(s), ensuring that settlements are final and balances are accurate.

An embodiment of the present invention is directed to making cross-currency payments. An FX Operator for a global system may receive quotes in eligible pairs from authorized and designated FX Traders (who may commit to continuously quote in certain pairs and amounts per rules established by the FX operator) and stream the best or optimal rate publicly. Each FX Trader may have e-cash accounts in both or multiple currencies in a quoted pair.

The FX Operator may be authorized under the rules of each currency's e-cash system to instruct currency Operators to transfer funds in order to lock in rates and to effect the simultaneous execution and settlement of a new form of integrated tri-party transaction for the payer, payee and FX Trader to effect the cross-currency payment.

The Payer may specify the amount to be paid in terms of the Payer currency or the Payee currency. For example, a Payer with a $ account wanting to pay someone €, can fix the $ amount they want to pay and lock in a € amount based on a quote, or fix the € amount they want received and lock in the $ amount they will pay based on a quote.

FIGS. 1A-1G are exemplary system diagrams that illustrates core elements of e-cash, according to an embodiment of the present invention. As shown in FIG. 1A, an exemplary system may include Federal Reserve Bank 110, USD e-cash ledger 120 and a plurality of banks, represented by Bank 1, Bank 2, Bank 3 and Bank 4. End Users may access digital wallets through mobile devices, represented by 130, 132, 134 and 136. End Users may use any personal computing device, including phones, wearables, smart devices, terminals, kiosks, etc. The mobile device may execute an application that provides the features and functionality associated with an embodiment of the present invention. Other variations and implementations may be supported.

Federal Reserve Bank 110 may manage liabilities, as shown by Individual master accounts 112 and Joint Accounts 114. USD e-cash ledger 120 may include total e-cash issued and individual bank totals including end user accounts, transactions, etc. Each of the plurality of banks may manage assets and liabilities.

Figure 2:
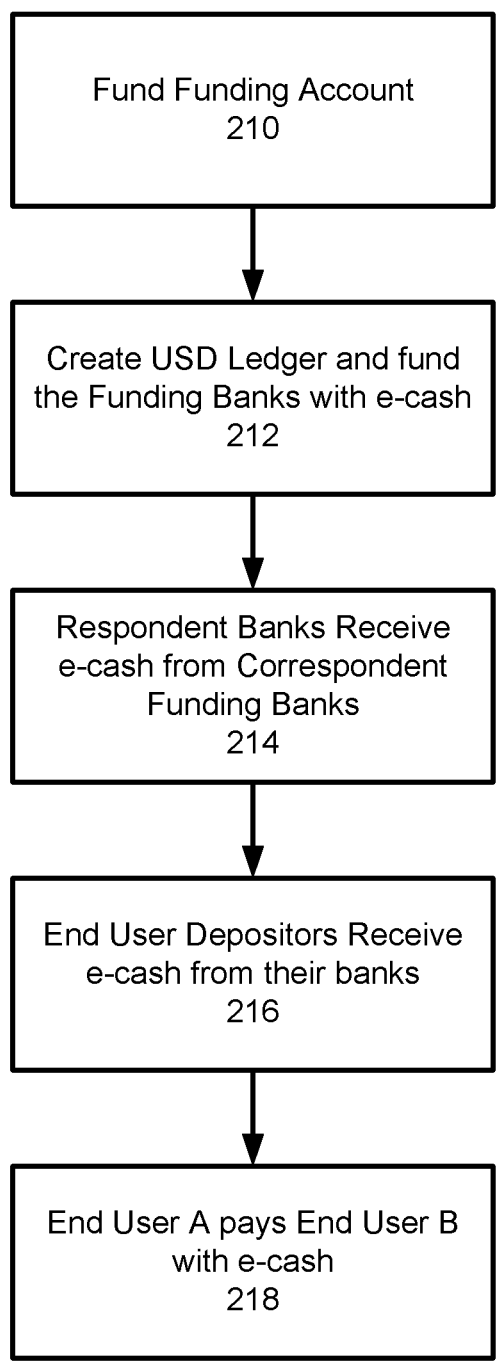
FIG. 2 is an exemplary flowchart, according to an embodiment of the present invention.

FIG. 2 is an exemplary flowchart, according to an embodiment of the present invention. At step 210, a funding account may be funded. Step 212 credits the USD ledger and funds the Funding Banks with e-cash. At step 214, respondent banks receive e-cash from their correspondent Funding Banks. At step 216, end user depositors receive e-cash from their banks. At step 218, an end user may pay another end user with e-cash. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

As shown in FIG. 1B, funding accounts may be funded. Funds from Banks 1, 2 and 3 may be used to fund a Joint Accounts, as shown by 140.

Figure 1C:
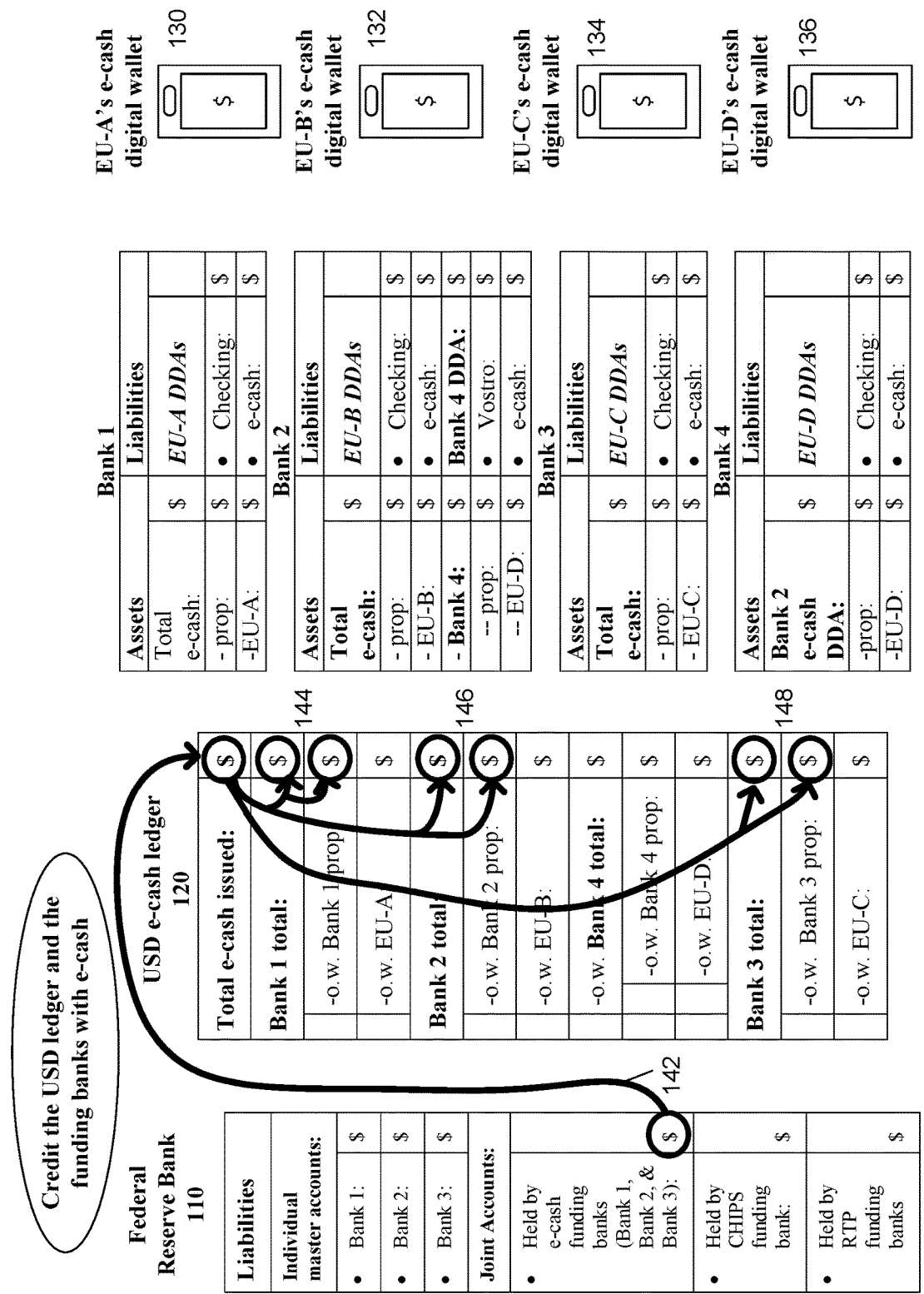

FIG. 1C illustrates crediting the USD ledger and the funding banks with e-cash. As shown in FIG. 1, funds from the Joint Account, as shown by 142, may be used to credit the USD ledger and specifically to funding banks Bank 1, Bank 2 and Bank 3, as shown by 144, 146 and 148, respectively. The term "prop" as used in the Figures refers to proprietary balance.

Figure 1D:
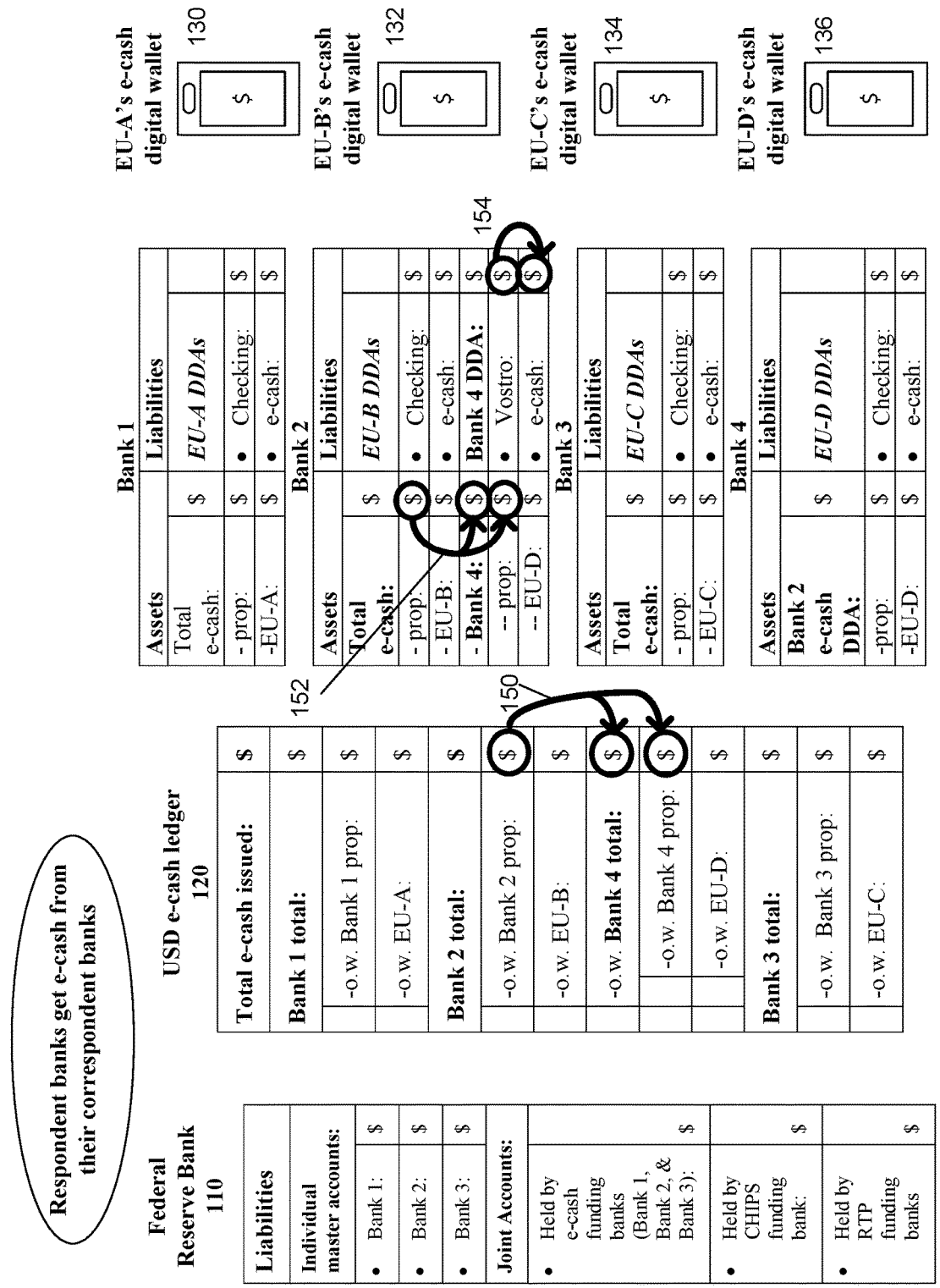

As shown in FIG. 1D, respondent banks may receive e-cash from their correspondent banks. In this example, Bank 2 sends funds to Bank 4, as shown by 150. This is further reflected by 152 and 154.

Figure 1E:
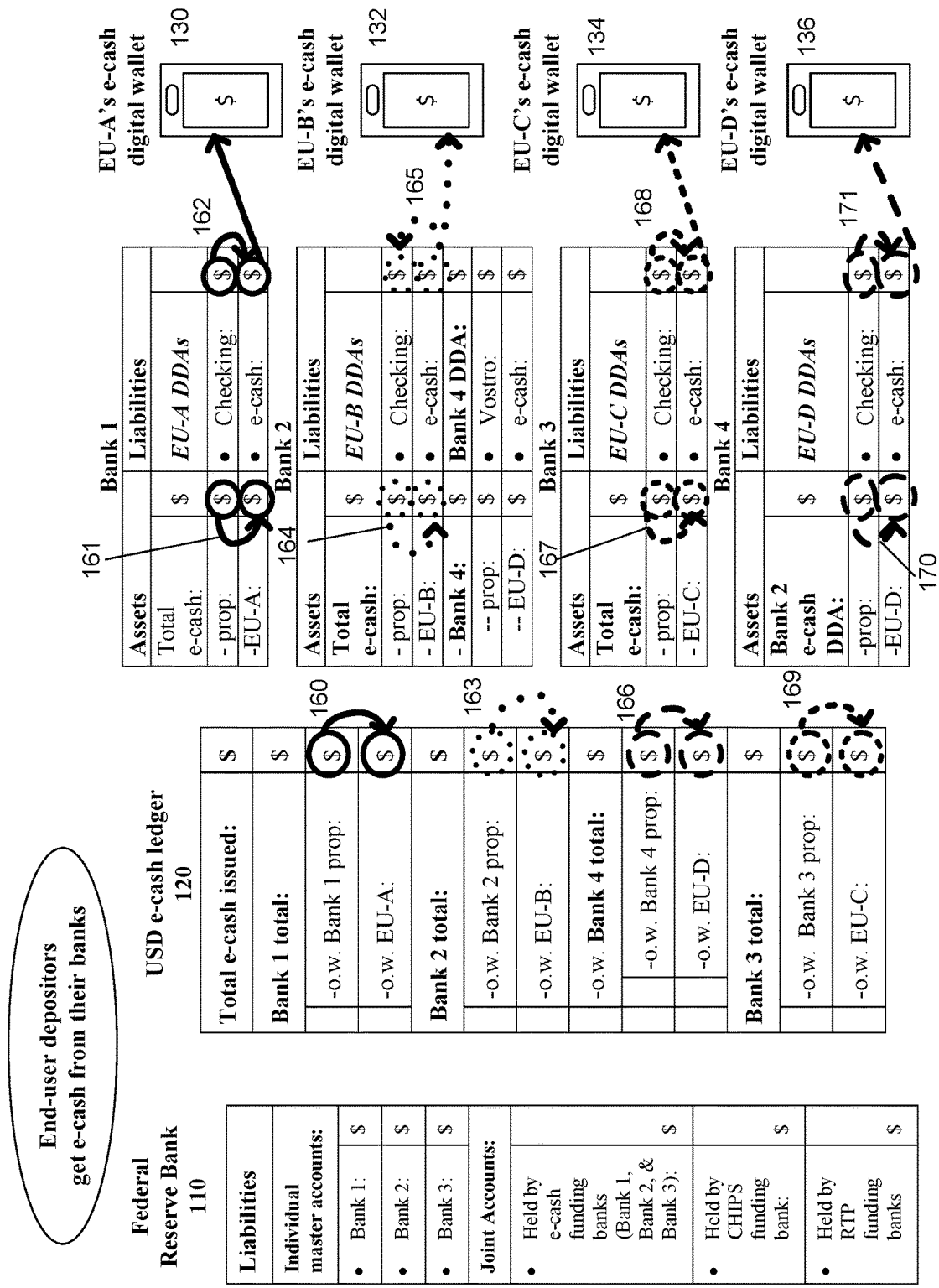

As shown in FIG. 1E, end-user depositors may receive e-cash from their banks. End User 130 receives e-cash from Bank 1, shown 160, 161 and 162. End User 132 receives e-cash from Bank 2, shown 163, 164 and 165. End User 134 receives e-cash from Bank 3, shown 166, 167 and 168. End User 136 receives e-cash from Bank 4, shown 169, 170 and 171.

Figure 1F:
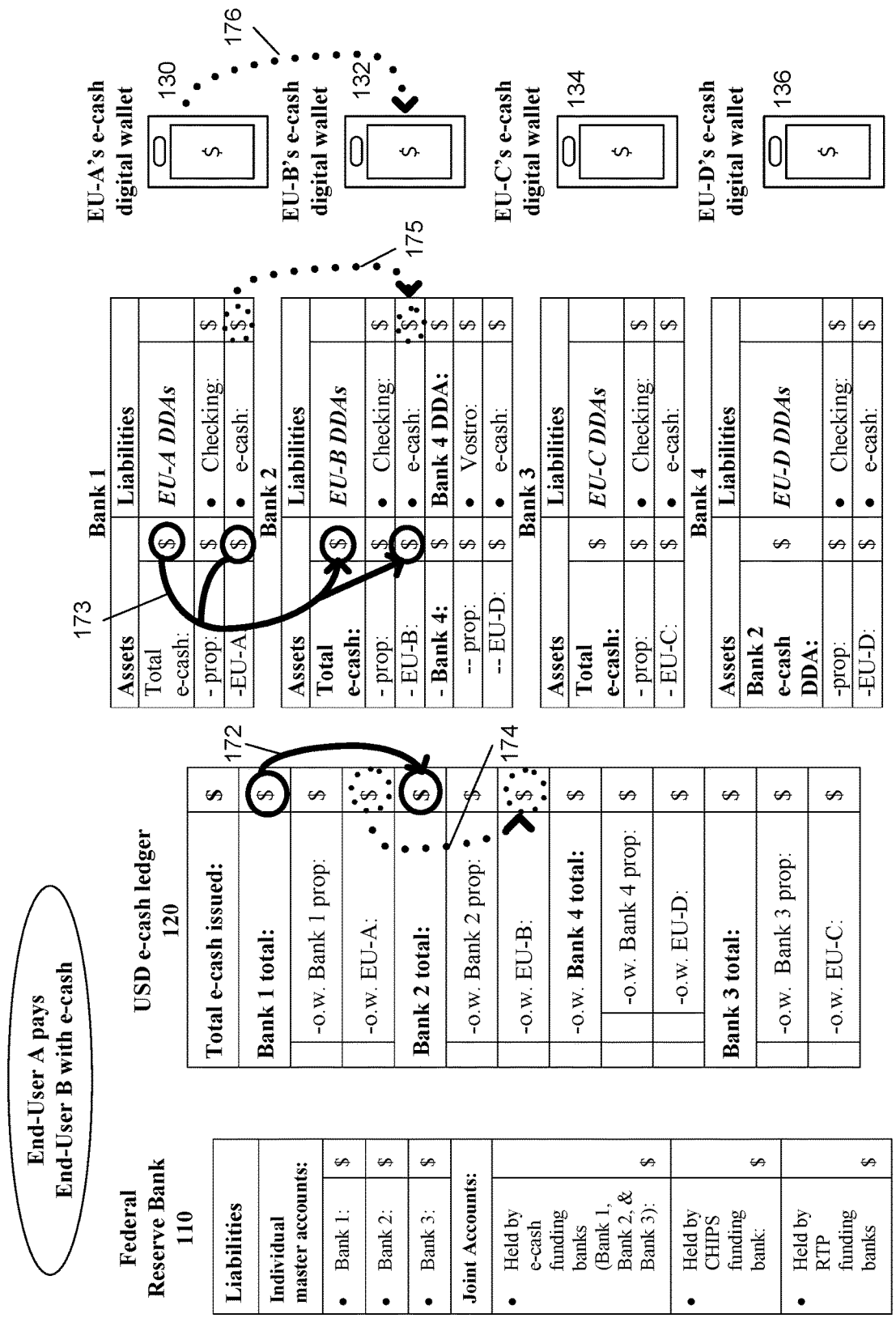

FIG. 1F provides an exemplary scenario where end user A 130 pays end user B 132 with e-cash, as shown by 176. As shown in FIG. 1F, the operator simultaneously transfers e-cash from end user A's bank (Bank 1) to end user B's bank (Bank 2) as shown by 172 (which effects 173) and from end-user A to end-user B as shown in 174 (which effects 175).

Figure 1G:
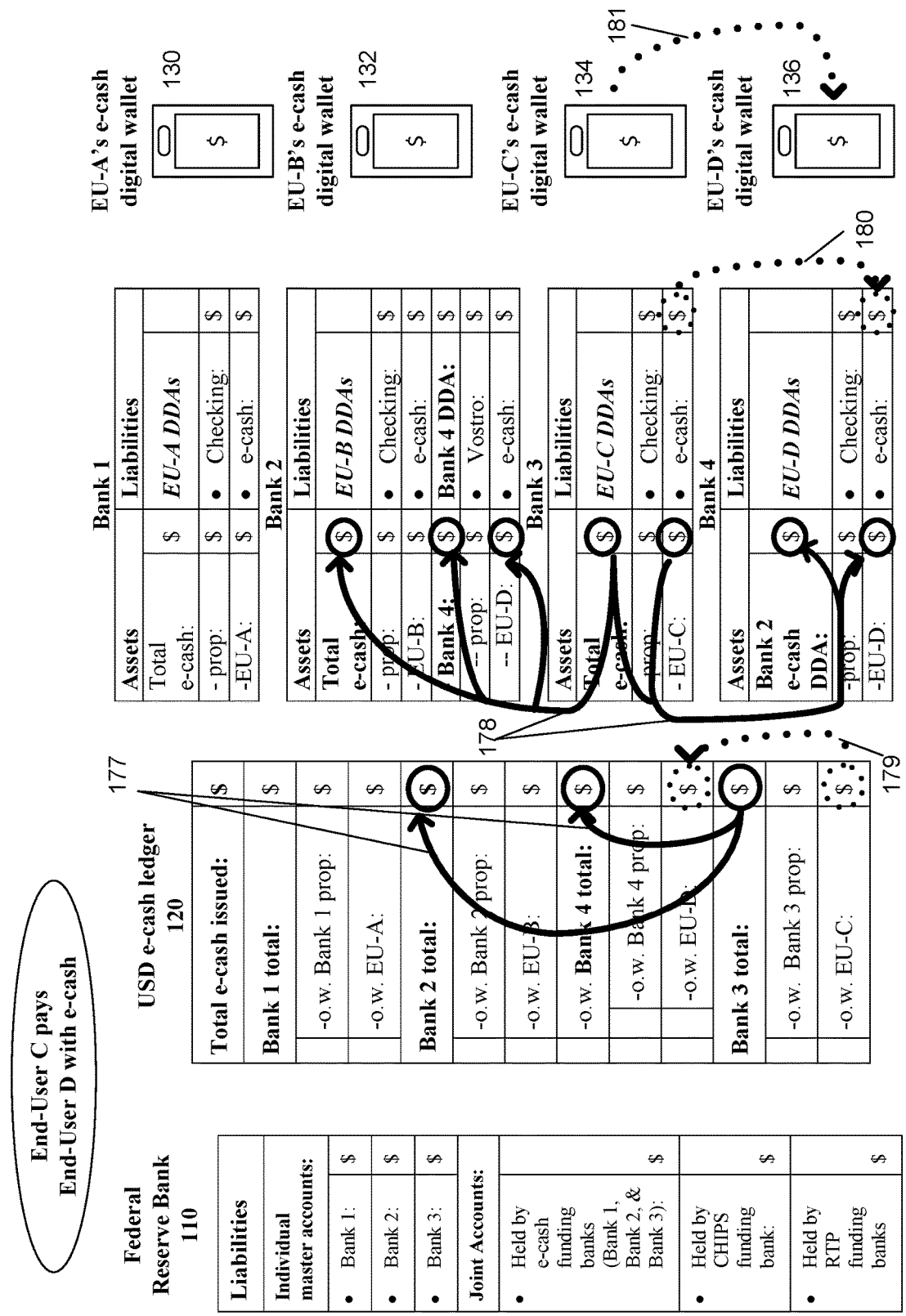

FIG. 1G illustrates an exemplary scenario where end user C pays end user D with e-cash, as shown by 181. As shown in FIG. 1G, the operator simultaneously transfers e-cash from end user C's bank (Bank 3) to end user's bank (Bank 4) via its correspondent bank (Bank 2), as shown by 177 (which effects 178) and from end user C to end user D as shown by 179 (which effects 180).

Figure 3A:
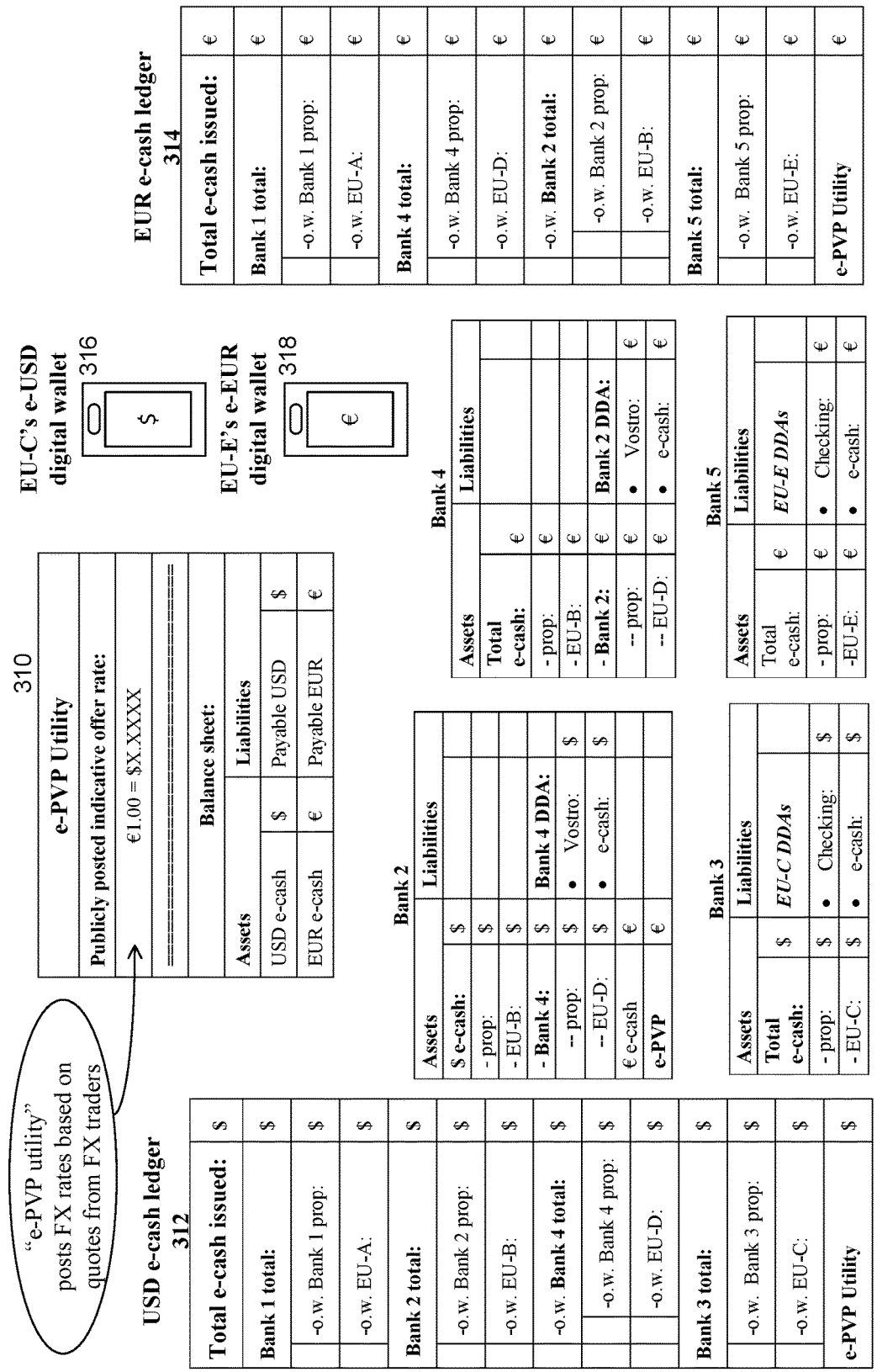
FIGS. 3A-3D are exemplary illustrations of cross currency implementations, according to an embodiment of the present invention.

FIGS. 3A-3D are exemplary illustrations of cross currency implementations, according to an embodiment of the present invention. As shown in FIG. 3A, an exemplary system may include e-PVP (payment versus payment) Utility 310, USD e-cash ledger 312, a plurality of banks represented by Bank 2, Bank 3, Bank 4, Bank 5 and EUR e-cash ledger 314. As shown in FIG. 3A, an exemplary system may include an FX operator (which is labelled e-PVP Utility 310). Users may interact with the system via mobile devices, shown by 316 and 318. As shown in FIG. 3A, e-PVP Utility 310 may post FX rates based on quotes from FX traders. e-PVP Utility represents a settlement mechanism that ensures that the final transfer of a payment in one currency occurs when the final transfer of a payment in another currency takes place to effect the simultaneous execution and settlement of a new form of integrated tri-party transaction for the payer, payee and FX Trader to effect the cross-currency payment. While the examples describe cross currency payments from a first currency to a second currency, the embodiments of the present invention may be applied to transactions involving various paired combinations of multiple currencies.

Figure 4:
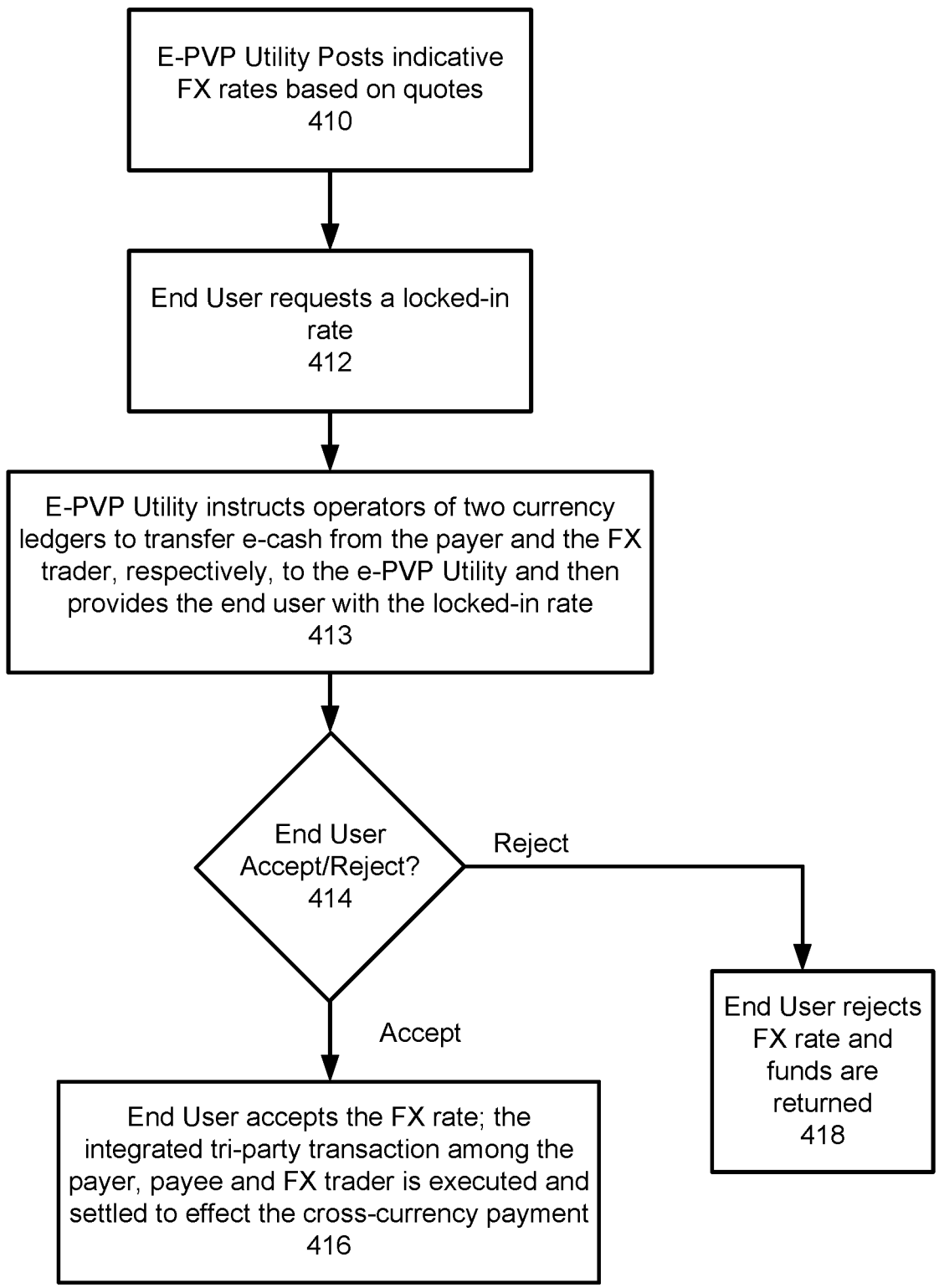
FIG. 4 is an exemplary flowchart, according to an embodiment of the present invention.

FIG. 4 is an exemplary flowchart, according to an embodiment of the present invention. At step 410, an e-PVP utility may post indicative FX rates based on quotes from FX traders. At step 412, end user C may request a locked-in rate. At step 413, E-PVP Utility instructs operators of the two currency ledgers to transfer e-cash from the payer and the FX trader, respectively (and from all relevant correspondent banks in their respective chains), to the E-PVP Utility, and then provides the End User with a locked-in rate. The end user may accept or reject the locked-in rate at Step 414. If end user C accepts the FX rate, then the e-PVP utility may execute and settle the integrated tri-party transaction among the payer, payee and FX trader to effect the cross-currency payment, at step 416. If end user C rejects the FX rate then the E-PVP Utility instructs the ledger operators to return the respective funds to the payer and FX trader, at step 418. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

Figure 3B:
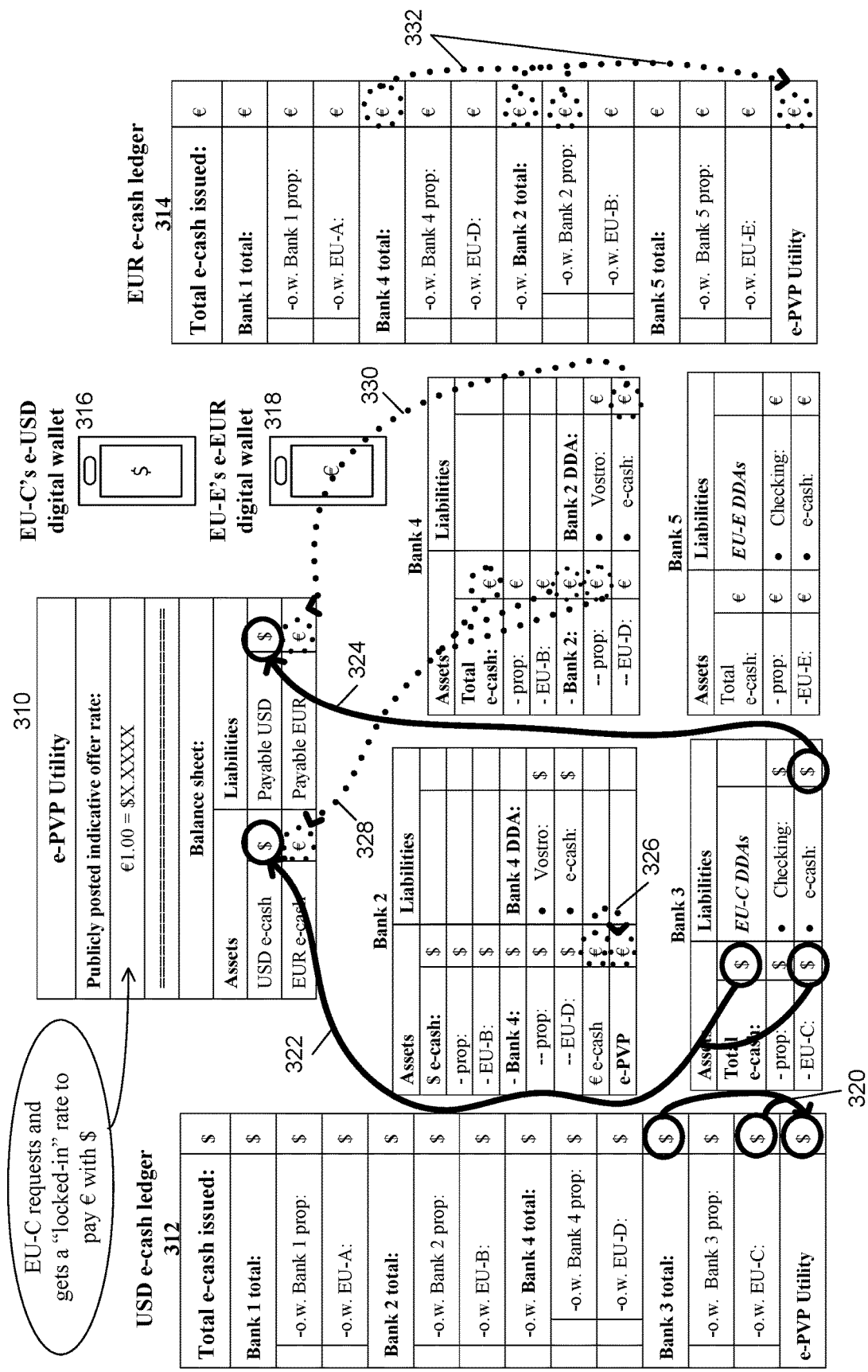

FIG. 3B shows the underlying detail of step 413 for the E-PVP Utility to provide an End User with a locked-in rate. Upon request from end user C for a locked in rate, E-PVP Utility instructs the US Dollar e-cash operator to transfer USD e-cash from end user C to the E-PVP Utility, as shown by 320 (with the effect of 322 and 324); and instructs the Euro e-cash operator to transfer EUR e-cash from Bank 2 (which the E-PVP Utility determines is the FX trader with the best FX rate) to the e-PVP Utility, as shown by 332 (with the effect of 328 and 330), respectively.

Figure 3C:
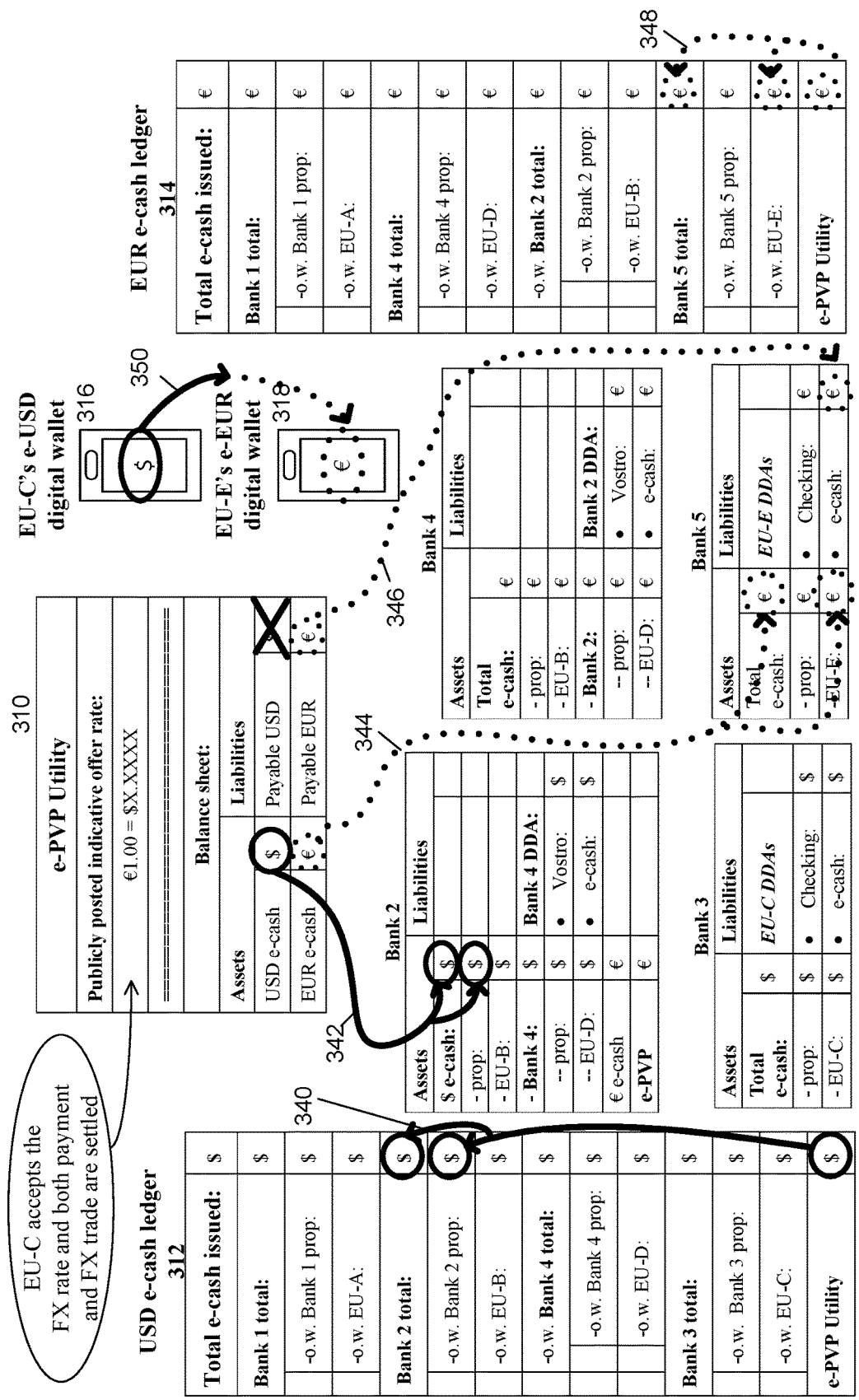

As shown in FIG. 3C, if EU-C accepts the FX rate, then the e-PVP utility may execute and settle the integrated tri-party transaction among the payer, payee and FX trader to effect the cross-currency payment. The E-PVP Utility simultaneously instructs the USD operator to transfer USD to Bank 2 as shown in step 340 (with the effect of 342) to execute and settle the integrated FX trade; and instructs the EUR operator to transfer Euro to the payee as shown in 348 (with the effect of 344 and 346).

Figure 3D:
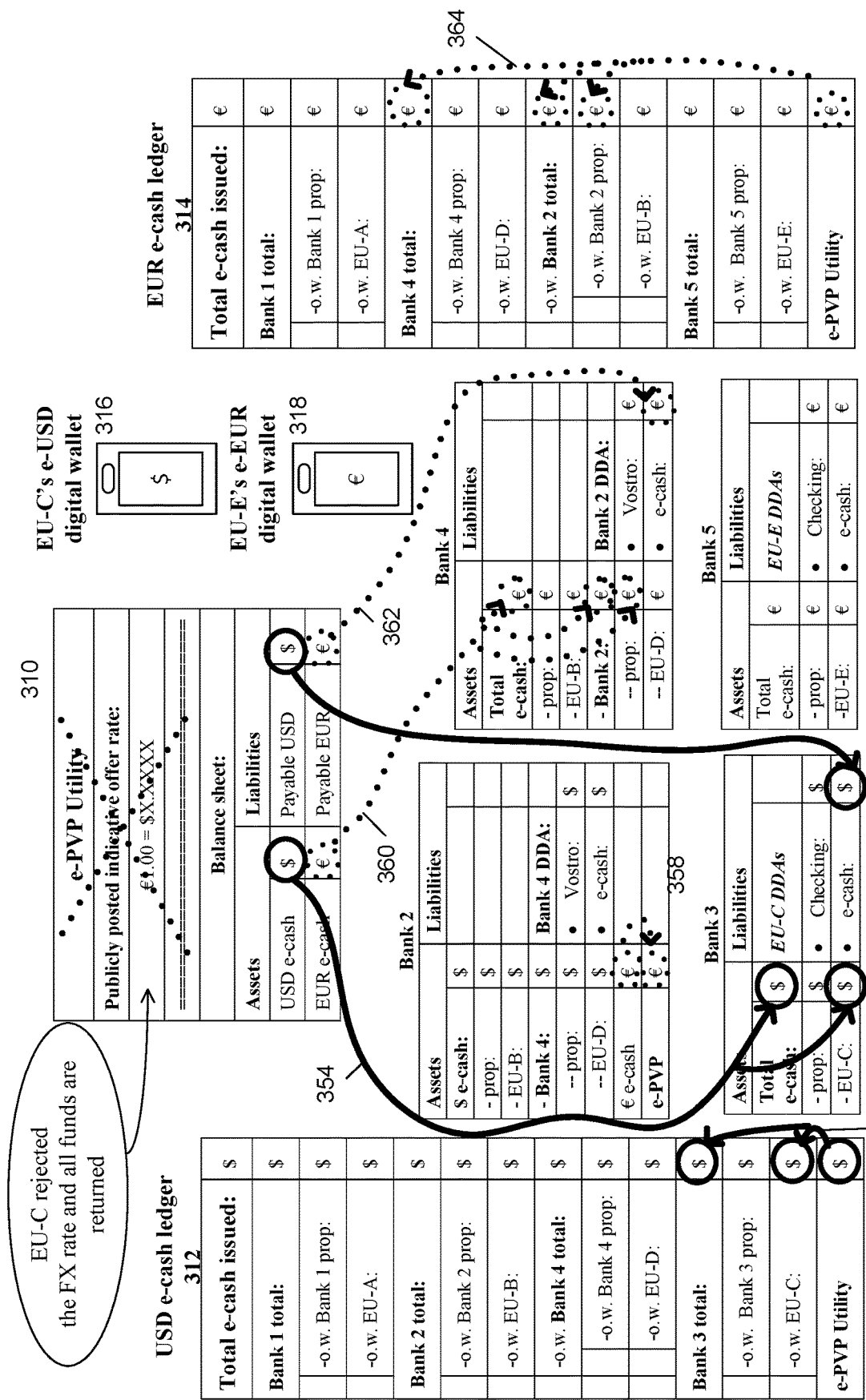

As shown in FIG. 3D, EU-C may reject the locked in FX rate and the E-PVP Utility instructs the currency ledger operators to return the respective funds. Funds for EU-C are returned as shown by 352 (with the effect of 354 and 356). Funds for EU-E are returned as shown by 364 (with the effect of 360 and 362).

An embodiment of the present invention is directed to a new type of commercial bank deposit, called an "e-cash account." The balance in an e-cash account may be referred to as "e-cash" for the purpose of this description. For example, e-cash may be a demand deposit liability of the bank and further covered by deposit insurance, where available.

According to an embodiment of the present invention, the e-cash account may function as a "digital wallet" and e-cash may function as "digital money" in that digital wallet. In addition, e-cash may be paid/transferred instantly 24×7, including cross-border, to anyone else with an e-cash account. The instant 24×7 liquidity of e-cash may be guaranteed by pre-funded, dedicated "central bank money." Any bank may offer an e-cash account to any of its depositors, including retail, wholesale; domestic, cross-border; respondent banks; payment service providers, etc. An e-cash account is a simple, easy-to-use "no frills" account, and so may be offered at low or no cost to the "unbanked" to promote financial inclusion.

An embodiment of the present invention may be directed to creating e-cash. A "funding account" (FA) may be established at a central bank of issue for that currency. For USD e-cash, this may be a "joint account" at FRBNY, for example.

A set of "funding banks" (FBs) may "hold" or "own" the FA. Any and all banks eligible to hold an account at the central bank of issue may be a FB for that currency. For example, if the FA is held at a commercial bank or special-purpose utility, it is also assumed for the purpose of this description that any bank eligible to hold an account at that commercial bank or utility would also be eligible to be a FB in that currency. Each currency's FBs may be the joint holders/owners of the FA for that currency. According to an exemplary embodiment, the FBs' individual and collective roles, rights and relationships vis-à-vis the FA may be assumed to be functionally equivalent to those of the holders of a "joint account" at (and as defined in the terms and conditions set by) the FRBNY. An embodiment of the present invention may be independent of the particular FB eligibility criteria that will need to be defined to satisfy applicable laws, regulations, requirements, and policies with respect to that currency.

The FA for a currency may be established on the books of an acceptable commercial bank or a special-purpose "utility." For example, for Chinese renminbi ("RMB"), the FA may be established on the books of a PBOC-authorized off-shore RMB settlement bank. As another example, the arrangement/operator for a currency may be established as a special purpose "utility" that is authorized (a) to have an account in its own name at the central bank of issue and (b) to accept deposits and to establish the FA as its direct liability. An embodiment of the present invention may be independent of the specific form or location of the FA.

An "operator" may be appointed by the FBs to control the FA and to manage the e-cash system for that currency. The operator may be responsible for the ongoing safety and efficiency of the arrangement, and for adhering to applicable laws, regulations, requirements, and policies with respect to the arrangement. According to an embodiment of the present invention, the operator may serve as an "agent" of the FA, with sole authority to transfer funds out of the FA. For illustration, the FA may be assumed to take the functionally equivalent form of a "joint account" at (and as defined in the terms and conditions set by) the Federal Reserve Bank of New York (FRBNY). Likewise for illustration, the operator's agent authority may be assumed to be functionally equivalent to that of an agent of a "joint account" at (and as defined in its terms and conditions set by) the FRBNY.

For example, the USD FBs may appoint the Clearing House (TCH) to operate the USD e-cash system. An e-cash "ledger" may be built and maintained by the operator. Each FB may have a place and total balance on the ledger. Each FB may establish individual sub-balances on the ledger dedicated to each of its individual e-cash account depositors.

For example, an operator may build and maintain a ledger for each currency to support an embodiment of the present invention. A separate and independent arrangement, operator, and/or ledger may be established per currency, if desired/required. Likewise, a separate and independent arrangement, operator, and/or ledger may be established for different categories of "e-cash account" holders (e.g., retail, wholesale, etc.), if desired/required. Each FB may have a place and total balance on the currency's ledger, which reflects in "real time" its total available balance for the purposes of the arrangement. Each FB may be authorized under the arrangement to establish unique, individual sub-balances on the ledger that it may associate with each of its individual depositors, subject to the arrangement's rules, limitations, and any other applicable laws, regulations and policies.

With an embodiment of the present invention, e-cash may be used globally. Any FB, non-funding bank (NFB), or payment service provider (PSP), whether domestic or foreign, may establish an e-cash account at an FB and then, in turn, offer e-cash accounts and services to its respective customers, including to other banks and PSPs that, in turn, can do likewise. By building out the ledger through existing or new correspondent banking and PSP relationships, e-cash in any currency may be offered to any bank depositor and to any PSP customer, domestically and around the world.

An embodiment of the present invention may be directed to funding e-cash. For example, each FB may transfer an amount of funds into the FA that it wishes to have immediately available to support its issuance of "e-cash" to its depositors. FB depositors may be retail and wholesale non-bank end users (EUs); respondent non-funding banks (NFBs); and payment service providers (PSPs). Transfers into (and out of) the FA may take place via available system(s) used to transfer funds between central bank account holders (e.g., Fedwire Funds Service ("Fedwire") or National Settlement Service ("NSS"), in the case of USD). If the FA is held at a commercial bank or special-purpose utility, then transfers may take place via the method(s) used (a) to transfer funds to/from FBs and that commercial bank/utility (e.g., via the currency's RTGS system) and/or (b) to effect "on us" transfers between the commercial bank/utility's individual account holders (e.g., via SWIFT or a proprietary messaging network). Upon each FB's successful transfer of funds into the FA, the operator credits both the "total balance" and the transferable "proprietary sub-balance" on the currency ledger that is associated with each FB.

Each FB may periodically transfer funds into the FA. Each FB's "total balance" and its "proprietary sub-balance" may be credited with the amount of funds it transferred into the FA. Those funds may be immediately available to support the FB's issuance of e-cash to its depositors (such as "vault cash" and banknotes loaded into an ATM). The system of an embodiment of the present invention may alert and/or automate the replenishment of each FB's FA balance, as desired or required by the system. For USD, the Federal Reserve's Fedwire Funds Service or National Settlement Service (NSS) may be used to transfer funds into the FA.

FB depositors may convert their "traditional" deposit balances into e-cash instantly 24×7. This may be based on: (1) whether the depositor has a sufficient traditional balance (or credit line), like an ATM withdrawal; (2) the amount is within any daily/weekly/etc. limits that may be set by the FB or the system, like an ATM withdrawal; and (3) the FB has a sufficient proprietary sub-balance on the ledger, e.g., sufficient vault cash or banknotes in an ATM to cover a cash withdrawal. According to an embodiment of the present invention, if the above three conditions are met, the amount on the ledger may be transferred from the FB's proprietary sub-balance to the sub-balance it previously established for the depositor.

The FB's NFB and PSP depositors may likewise convert their "traditional" FB deposit balances (or credit lines) into e-cash instantly 24×7, subject to the same or similar conditions. Those NFBs and PSPS may then, in turn, use their proprietary e-cash balances to support their own issuance of e-cash to their respective depositors. Each FB, NFB, and PSP may offer each of its depositors an optional automatic e-cash "replenishment" from its traditional accounts, as desired. Replenishment may be subject to the same conditions applied to an "ad hoc" request for e-cash.

Figure 5A:
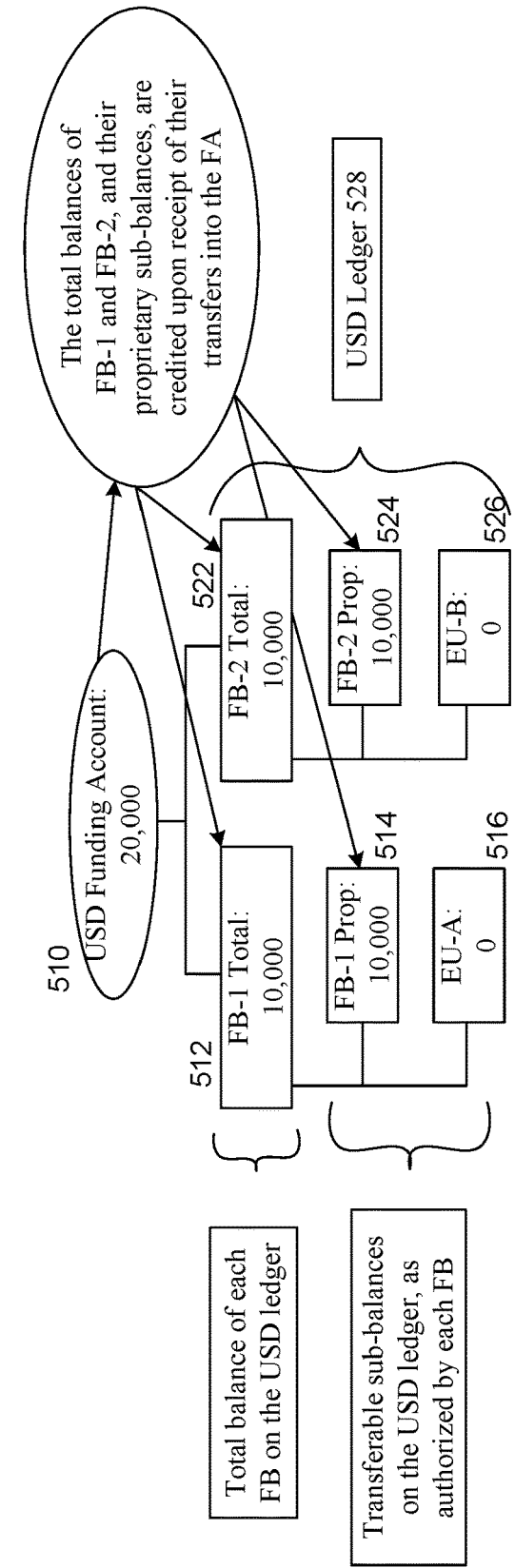
FIGS. 5A-5C are exemplary illustrations of funding accounts, according to an embodiment of the present invention.
Figure 5B:
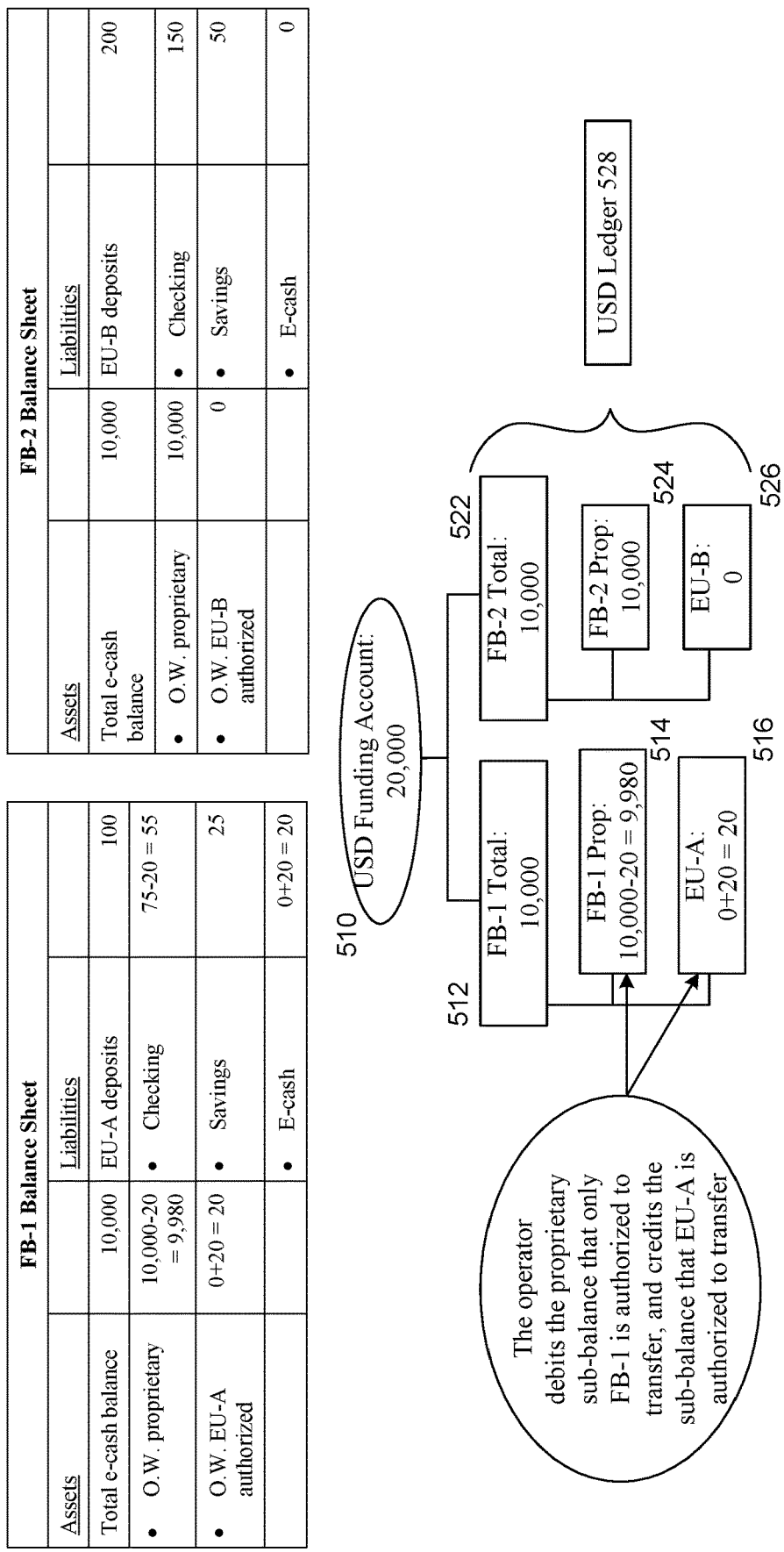
Figure 5C:
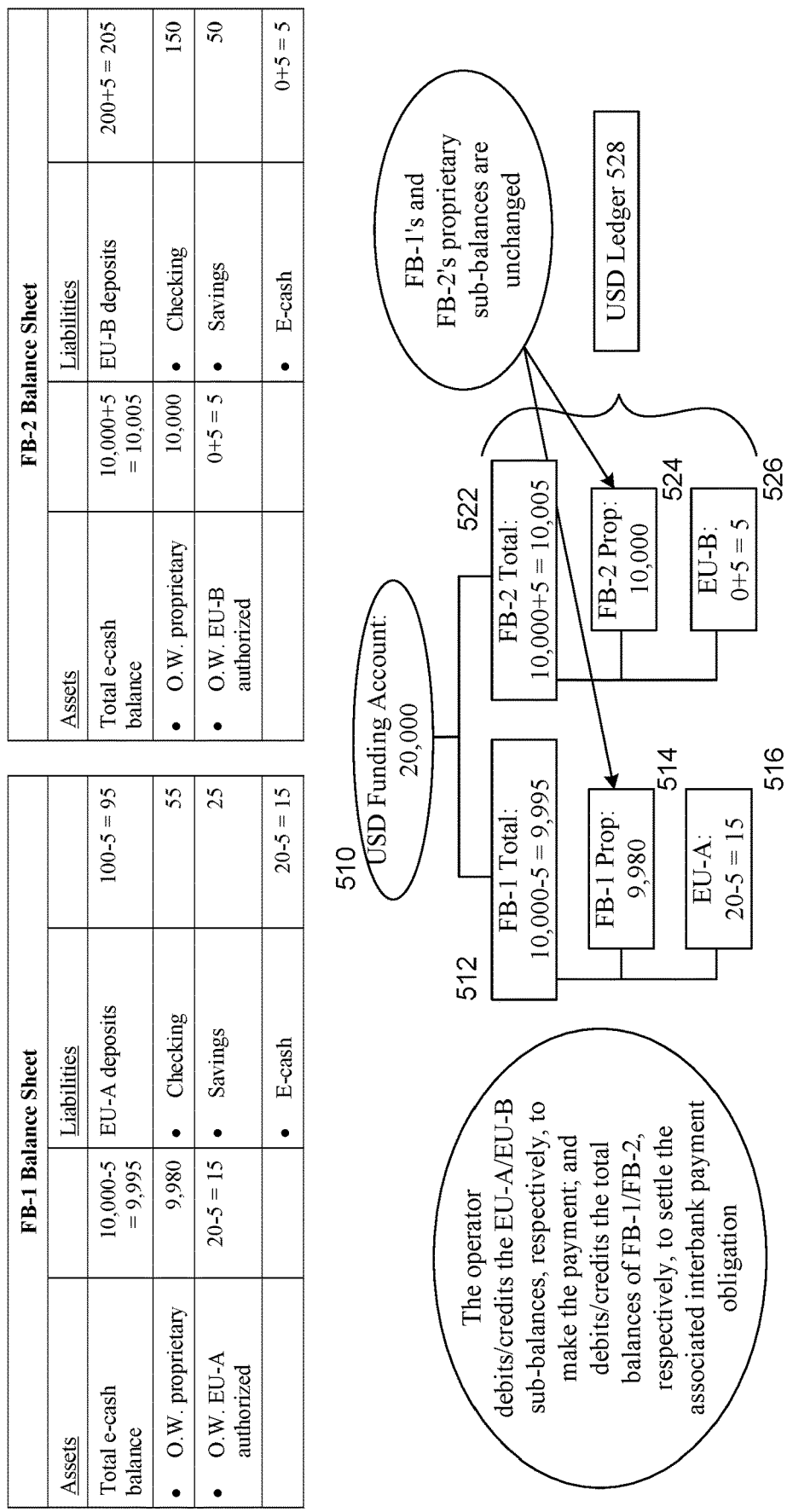

FIGS. 5A-5C are exemplary illustrations of funding accounts, according to an embodiment of the present invention. FIG. 5A illustrates an example where funding banks FB-1 and FB-2 each transfer $10,000 to a funding account. FIG. 5A shows FB-1 Balance Sheet where FRBNY debited FB-1's master account and credited the FA by $10,000. As shown in FB-2 Balance sheet, FRBNY debited FB-2's master account and credited the FA by $10,000. USD Funding Account is shown by 510. Total balance of each FB on the USD ledger is shown at 512, 522. Transferable sub-balances on the USD ledger, as authorized by each FB, are shown by 514, 516, 524, and 526. USD Ledger is represented by 528. Total balances of FB-1 and FB-2 and their proprietary sub-balances are credited upon receipt of their transfers into the FA.

As shown in FIG. 5A, "EU-A" represents a nonbank end-user depositor at FB-1 with a checking and savings DDA. "EU-B" represents a nonbank end-user depositor at FB-2 with a checking and savings DDA. In this example, the two funding banks have already established sub-balance locations on the USD ledger that they have associated with their respective depositors, each with an initial balance of "zero". They have also established "proprietary" sub-balances for themselves.

FIG. 5A illustrates the relationship between, and the simultaneously occurring and interdependent changes to, the USD ledger and the corresponding elements of FB-1's and FB-2's balance sheets. These relationships and the simultaneously-occurring interdependent changes may be established as legally binding via the rules of the arrangement and FB-1's and FB-2's terms and conditions governing their respective depositors' e-cash accounts.

According to an exemplary illustration, FB-1 and FB-2 each provide an initial transfer of $10,000 to fund the FA out of their respective FRBNY master accounts. Upon each FB's successful transfer of funds into the FA, the operator credits both the "total balance" and the transferable "proprietary sub-balance" on the currency ledger that is associated with each FB.

An embodiment of the present invention is directed to converting a traditional deposit into e-cash. For example, EU-A may request to convert $20 in its checking account into e-cash, and all three conditions are met. If EU-A has insufficient funds, or if the request exceeds any applicable limit, a message may be sent to EU-A explaining why the request is denied. If FB-1 has an insufficient proprietary balance to meet the request, a message may be sent EU-A explaining why the request is denied (e.g., "e-cash is currently not available. Please try again shortly"). This may be comparable to a message displayed when an ATM is temporarily out of cash or out of order. In addition, this may also trigger a message alerting FB-1 to top up its proprietary balance.

FIG. 5B illustrates an example where EU-A's request for $20 in e-cash is approved. As shown in FIG. 5B, an operator may debit the proprietary sub-balance that only FB-1 is authorized to transfer and credits the sub-balance that EU-A is authorized to transfer.

An embodiment of the present invention is directed to holding e-cash. The ledger represents the "controlling accounting" of, and changes to, the relevant assets and liabilities of all relevant parties. Each FB's total balance—including each sub-balance it establishes for each of its depositors—represents an asset of the FB: the FB's right to be paid out of the FA. Each sub-balance established for a depositor may also represent the depositor's direct claim on the FB (or on its NFB or PSP). Each FB (and NFB or PSP) may guarantee the instant 24×7 availability of its depositor's e-cash balance. This guarantee may be backed 100% by pre-funded/dedicated "central bank money" in the FA.

According to an exemplary embodiment, each FB (and NFB or PSP) may grant standing authorization to the operator to credit/debit each of its sub-balances (and, equally, its total balance) to settle its depositors' e-cash payments/transfers. This has the effect of changing the relevant assets/liabilities of each FB, NFB, and/or PSP and their respective depositors vis-à-vis each other every time e-cash is created or transferred. Of note, each FB (and NFB or PSP) may have the right to block any further debiting of (and crediting to) any of its depositors' sub-balances if and only if it is legally required to freeze or to seize a depositor's e-cash account. This right may be structured to be exercised under the same (or similar) legal conditions that would require the freezing or seizing of a depositor's traditional deposit account. Of note, the central bank of issue may choose to recognize the FB's proprietary sub-balance, or even its total balance, for reserve maintenance and "interest on reserves" purposes. Likewise, the central bank of issue may choose to recognize the sub-balances established for the FB's correspondent bank depositors as "pass-through" reserves.

An embodiment of the present invention is directed to de-funding e-cash. With an embodiment of the present invention, holders of e-cash may convert their e-cash into "traditional" deposit balances. For FBs in the USD system, the Federal Reserve's Fedwire Funds Service or National Settlement Service (NSS) may be used by the operator to transfer funds from the FA to the FBs' master accounts anytime those services are available. Of note, the system also may alert and/or automate the de-funding of each FB's proprietary balance, as desired or required by the system. NFBs and PSPs may convert their balances 24×7. This only requires the operator to debit and credit relevant sub-balances on the ledger. Of note, the system also may alert and/or automate the de-funding of each NFB's or PSP's proprietary sub-balance, as desired or required by either the system or the relevant FB.

Non-bank and non-PSP depositors may convert their balances 24×7. In this example, this only requires the operator to debit and credit the relevant ledger sub-balances. Of note, the system also may alert and/or automate the de-funding of each depositor's e-cash account, as desired or required by either the system or the relevant FB, NFB, or PSP. In addition, the system may have the capability to impose mandatory sweeps, in "real time," periodically (e.g., at the end of each day) and/or other interval, of individual or aggregate sub-balances that exceed limits that might be imposed by the central bank of issue for monetary policy/control purposes.

An embodiment of the present invention is directed to single currency payments with e-cash. With an embodiment of the present invention, one e-cash account holder may pay/transfer e-cash to another e-cash account holder when there is sufficient sub-balance on the ledger established for the payer and there is an existing sub-balance on the ledger established for the payee. According to another embodiment of the present invention, an optional "pre-condition" may be added. In this example, the payment/transfer must not exceed any individual transaction size limit that can be set by the system, by the FB, or by the relevant NFB or PSP.

If the conditions are met, the operator may instantly and simultaneously: (1) debit the payer's sub-balance, and also debit the sub-balances of any and all relevant FB, NFB and/or PSP through which the payer's e-cash account was established; and (2) credit the payee's sub-balance, and also credit the sub-balances of any and all relevant FB, NFB and/or PSP through which the payee's e-cash account was established. As a result, the payment obligation between the payer and payee, and the payment obligations between all of the relevant banks and PSPs in the underlying "traditional" payment chain, are settled simultaneously, irrevocably, and unconditionally (e.g., with finality) simply via changes made to the ledger by the operator. This process allows cross-border, single currency payments to be made instantly 24×7, even if both the payer's bank and the payee's bank have no direct foreign correspondent relationship. In this example, the only requirement is for the payer's and the payee's bank (or PSP) to establish an e-cash account directly with a FB or with any other NFB (or PSP).

FIG. 5C is an exemplary illustration, according to an embodiment of the present invention. FIG. 5C illustrates an example where EU-A's request to pay $5 to EU-B is approved. In this example, EU-A wants to pay/transfer $5 to EU-B, and all conditions are met (including any individual transaction size limit). If the first condition is not met, a message may be sent to EU-A indicating that it has insufficient e-cash in its e-cash account to complete the transaction. EU-A may then be given the option to initiate a request for additional e-cash from FB-1. If the second condition is not met, a message may be sent along the lines that "the payee is unknown or the payee information is incorrect: please try again". Optionally, if the amount exceeds any applicable individual transaction size limit, a message may be sent to EU-A accordingly.

As shown in FIG. 5C, the operator may credit/debit the EU-A/EU-B sub-balances, respectively, to make the payment and further debit/credit the total balances of FB-1/FB-2, respectively, to settle the associated interbank payment obligation. Further, FB-1's and FB-2's proprietary sub-balances are unchanged.

From EU-A's perspective, EU-A's total assets decreased by $5 (i.e., its e-cash account balance at FB-1).

From FB-1's perspective, FB-1's total assets decreased by $5 (i.e., its total balance on the ledger). As "compensation", FB-1's total liabilities also decreased by $5 (i.e., its DDA liabilities to EU-A).

From EU-B's perspective, EU-B increased its total assets by $5 (i.e., its e-cash account balance at FB-2).

From FB-2's perspective, FB-2's total liabilities increased by $5 (i.e., its DDA liabilities to EU-B). As "compensation", FB-2's total assets also increased by $5 (i.e., its total balance on the ledger). FB-2's sub-balance on the ledger associated with EU-B also increased by $5, which maintains the "100% backing" of FB-2's guarantee of the instant 24×7 liquidity of EU-B's "e-cash," which increased by $5.

From a "settlement" perspective, EU-A settled its payment obligation (or completed its desired transfer) by giving EU-B e-cash. The interbank payment obligation of FB-1 to FB-2 that arose when EU-A transferred e-cash to EU-B was simultaneously settled by transferring FB-1's equivalent balance on the ledger to FB-2.

An embodiment of the present invention is directed to cross-currency payments with e-cash. According to an embodiment of the present invention, a cross-currency payment involves an e-cash system to be established in the two currencies. For instance, a USD system may be established and operated by TCH, and a EUR system may be established and operated by Euro Banking Association (EBA) Clearing. It may also involve two additional types of entities. One or more "e-FX traders" that have established a sub-balance on each of the two currency ledgers and are willing to accept (e.g., trade) e-cash in the one currency in exchange for e-cash in the other. Where permitted, any firm or entity may act as an e-FX trader in those currencies for which it has an e-cash account. Each e-FX trader may need to establish and pre-fund a dedicated "FX sub-balance" on each currency's ledger. Each e-FX trader may be required to quote and continuously update its offer rate/amount 24×7.

An "e-PVP utility" may have the status of a joint holder/owner of the FA for each currency and further manage the integrated FX trading and settlement process. For example, the e-PVP utility may be operated by Continuous Linked Settlement (CLS) for CLS-eligible currencies. The e-PVP utility may continuously post the "best available" indicative FX offer rate, 24×7. The e-PVP utility may manage the "lock-in" process for a cross-currency payment. A payer may specify the exact amount of the currency it holds and wants to pay (e.g., to learn and lock in the amount of the second currency the payee will receive); or specify the exact amount of the second currency the payee should receive (e.g., to learn and lock in the required amount of the currency it holds). The e-PVP utility may ensure both the payer and e-FX trader(s) have the necessary amounts in their respective sub-balances and may then calculate and report the effective "lock-in" rate. It may do so by transferring the relevant sub-balances of the payer and the e-FX trader(s) to the e-PVP utility's sub-balance in each currency. Multiple e-FX traders may be part of the trade (and may be ranked and selected based on "best" offer rate), if/as needed to fulfill the requested cross-currency payment lock-in rate.

If the lock-in rate is accepted by the payer within the permitted timeframe (e.g., X seconds), the e-PVP utility may simultaneously execute and settle the integrated tri-party transaction among the payer, the payee, and the FX trader, which has the effect of executing and settling the cross-currency e-cash payment, the associated FX trade(s), and the associated payment obligations between any and all relevant FBs, NFBs and PSPs through which the payer's, the payee's, and the e-FX trader(s)'s e-cash accounts were established. If the lock-in rate is not accepted by the payer, the e-PVP utility may transfer the relevant sub-balances back to payer and the e-FX trader(s) that offers an e-cash account.

This process enables cross-currency payments instantly 24×7, even if both the payer's and the payee's banks offer only single-currency e-cash accounts and have no direct foreign correspondent relationships. The only requirement is for the payer's and the payee's bank (or PSP) to establish an e-cash account in their respective single currencies with a FB or with any other participating NFB (or PSP).

Figure 6A:
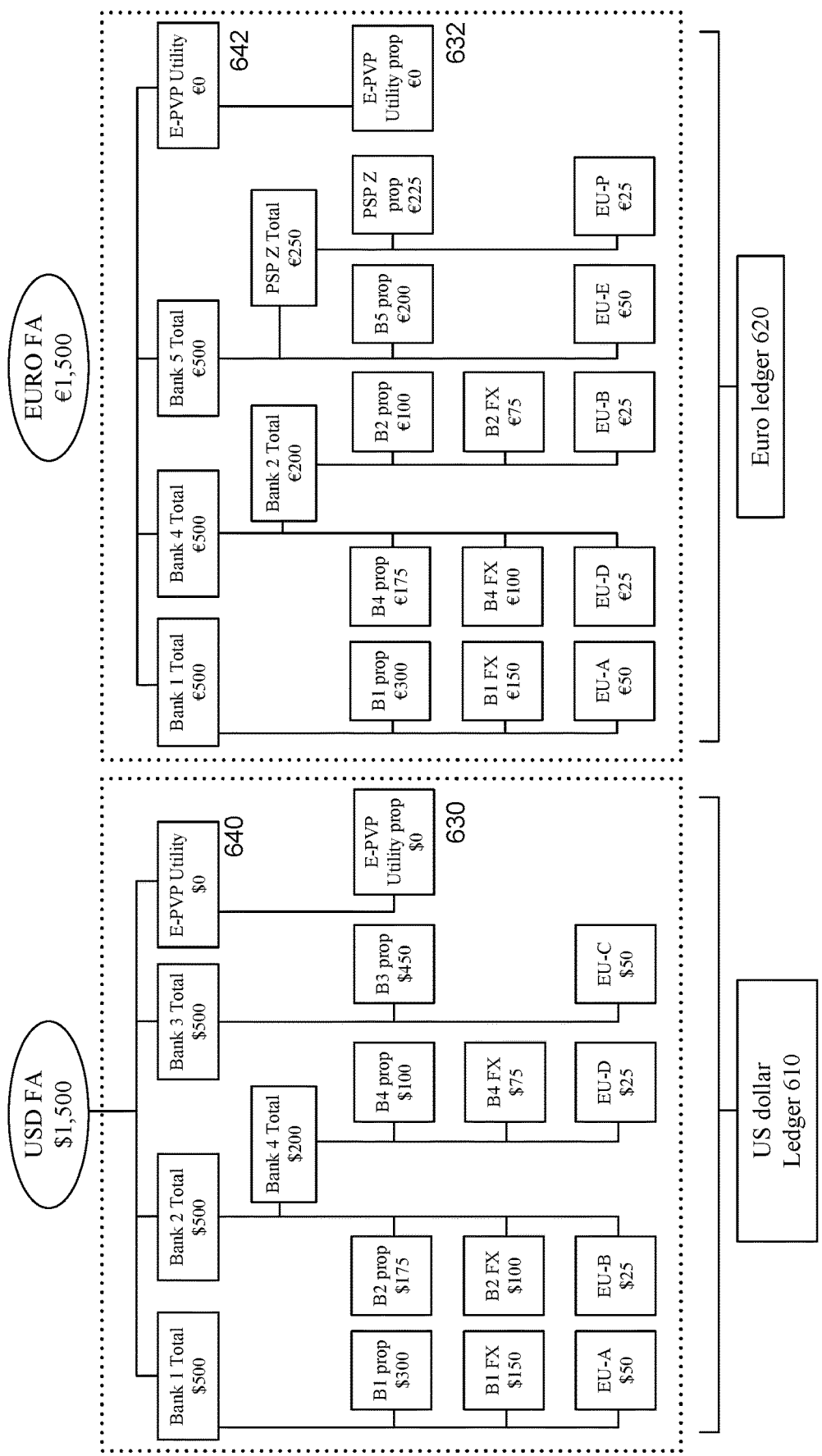
FIGS. 6A-6F illustrates a cross-currency implementation, according to an embodiment of the present invention.

An embodiment of the present invention is directed to cross-border, cross-currency payments and transfers. FIGS. 6A-6F illustrates a cross-currency implementation, according to an embodiment of the present invention. FIG. 6A involves two e-cash currency ledgers: one for USD e-cash, as shown by 610, and one for EUR e-cash, as shown by 620. FIG. 6A shows the two currency ledgers and the associated places/relationships of each of these entities on each currency ledger. FIG. 6A also provides example initial balances and sub-balances associated with each of these entities.

An embodiment of the present invention is directed to making a cross-border, single-currency payment. In this example, EU-C in New York has, and wants to pay, $5 to EU-D in Frankfurt. In this example, EU-D maintains USD denominated DDAs, including a USD e-cash account, with Bank 4 in Frankfurt. From the perspective of the USD operator/arrangement, this looks and processes no differently than a purely domestic USD e-cash payment/transfer. Because both EU-C and EU-D have sub-balances associated with each of them on the USD ledger, the debiting and crediting may occur exactly the same way, and subject to the same conditions, regardless of the physical location of EU-C and EU-D. FIG. 6A shows the relevant debits and credits to the USD ledger.

Figure 6B:
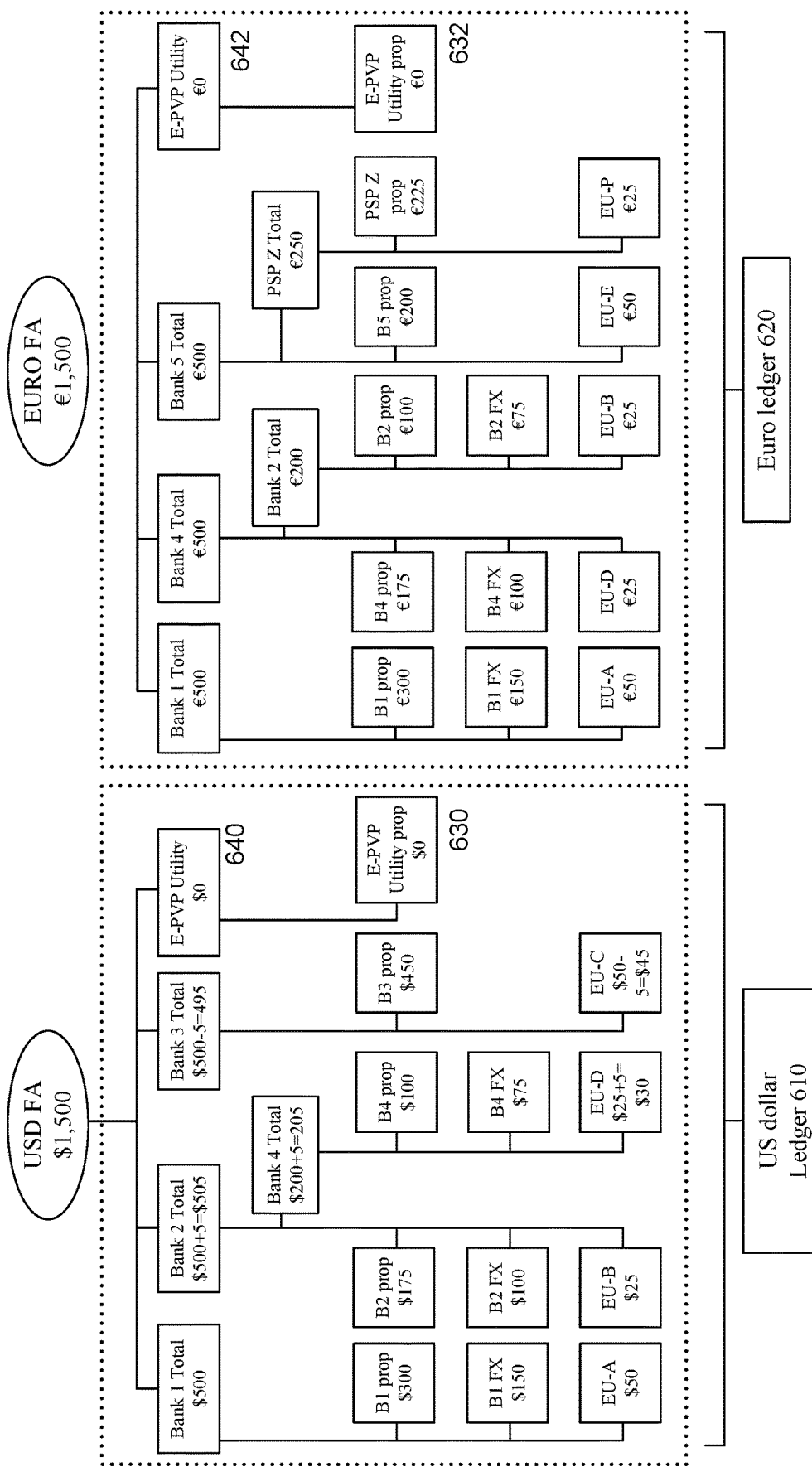

As shown in FIG. 6B, the USD e-cash operator debits/credits the EU-C/EU-D sub-balances, respectively, to make the payment; and (a) debits the total balance of Bank 3 and (b) credits the total balances of Bank 2 and Bank 4 to settle the associated interbank payment obligations. Further, there are no changes made to the euro ledger.

From EU-C's perspective: EU-C's total assets decreased by $5 (e.g., its e-cash account balance at Bank 3 in New York).

From Bank 3's perspective, Bank 3's total assets decreased by $5 (e.g., its total balance on the USD ledger). As "compensation", Bank 3's total liabilities also decreased by $5 (i.e., its DDA liabilities to EU-C).

From EU-D's perspective, EU-D increased its total USD-denominated assets by $5 (e.g., its USD e-cash account balance at Bank 4 in Frankfurt).

From Bank 4's perspective, Bank 4's total liabilities increased by $5 (e.g., its DDA liabilities to EU-D). As "compensation," Bank 4's total assets also increased by $5 (e.g., its DDA balances with Bank 2).

From Bank 2's perspective, Bank 2's total liabilities increased by $5 (e.g., its DDA liabilities to Bank 4). As "compensation", Bank 2's total assets also increased by $5 (e.g., its total balance on the USD ledger). Bank 2's sub-balance on the ledger associated with Bank 4 also increased $5, which maintains the "100% backing" of Bank 4's guarantee of the instant 24×7 liquidity of EU-D's "e-cash," which increased by $5.

From a "settlement" perspective, EU-C settled its USD payment obligation (or completed its desired transfer) by giving EU-D USD e-cash in its USD e-cash account with Bank 4 in Frankfurt. The associated interbank payment obligations between (a) Bank 3 and Bank 2, and (b) Bank 2 and Bank 4 were simultaneously settled by (a) transferring Bank 3's equivalent balance on the ledger to Bank 2, and (b) increasing Bank 4's equivalent DDA balance with Bank 2. EU-C in New York was able to use e-cash to make a cross-border US dollar payment to EU-D in Frankfurt, even though EU-C maintains its e-cash account at a US-based bank (Bank 3) that has no domestic or foreign correspondent banking relationships.

An embodiment of the present invention is directed to making a cross-currency payment with a pricing option. In this example, EU-C in New York wants to use US dollars to pay exactly €20 to EU-E in Frankfurt. EU-C maintains only USD-denominated DDAs, including a USD e-cash account, with Bank 3 in New York. Bank 3 has no euro correspondents. EU-E maintains only euro-denominated DDAs, including a euro e-cash account, with Bank 5 in Frankfurt. In this example, Bank 5 has no USD correspondents.

In this example, EU-C reviews the current indicative FX rates posted by the e-PVP utility. If interested, EU-C may request a "locked-in" rate from the e-PVP utility to pay exactly €20 to EU-E, using USD. If there is not an existing place/sub-balance on the ledger attributed to EU-E, the request may be denied with a message that "the payee is unknown or the payee information is incorrect: please try again."

In this example, the e-PVP utility determines the most competitive offer rate is posted by Bank 2. Bank 2 posts it is willing to sell up to €10 (out of a total euro FX sub-balance of €75) at €1=$1.1000.

The e-PVP utility determines that the next-most competitive offer rate is posted by Bank 1. Bank 1 posts it is willing to sell up to €100 (out of a total euro FX sub-balance of €150) at €1=$1.1010.

The e-PVP utility instructs the euro ledger operator to transfer €10 from the sub-balance associated with Bank 2 to the e-PVP utility proprietary sub-balance, and to transfer €10 from the sub-balance associated with Bank 1 to the e-PVP utility proprietary sub-balance. If either or both transfers is unsuccessful, the e-PVP utility will instruct the euro ledger operator to reverse any successful transfer and restart the process.

In this example, both transfers are successful, and so the e-PVP utility instructs the USD ledger operator to transfer $22.01 from the sub-balance associated with EU-C to the e-PVP utility proprietary sub-balance. As soon as that transfer is completed, the e-PVP utility will offer EU-C a "locked" in rate of €1=$1.1005 for a total USD cost of $22.01 to pay exactly €20. The locked-in effective rate calculated as [(10×1.1)+(10×1.101)]/20.

Figure 6C:
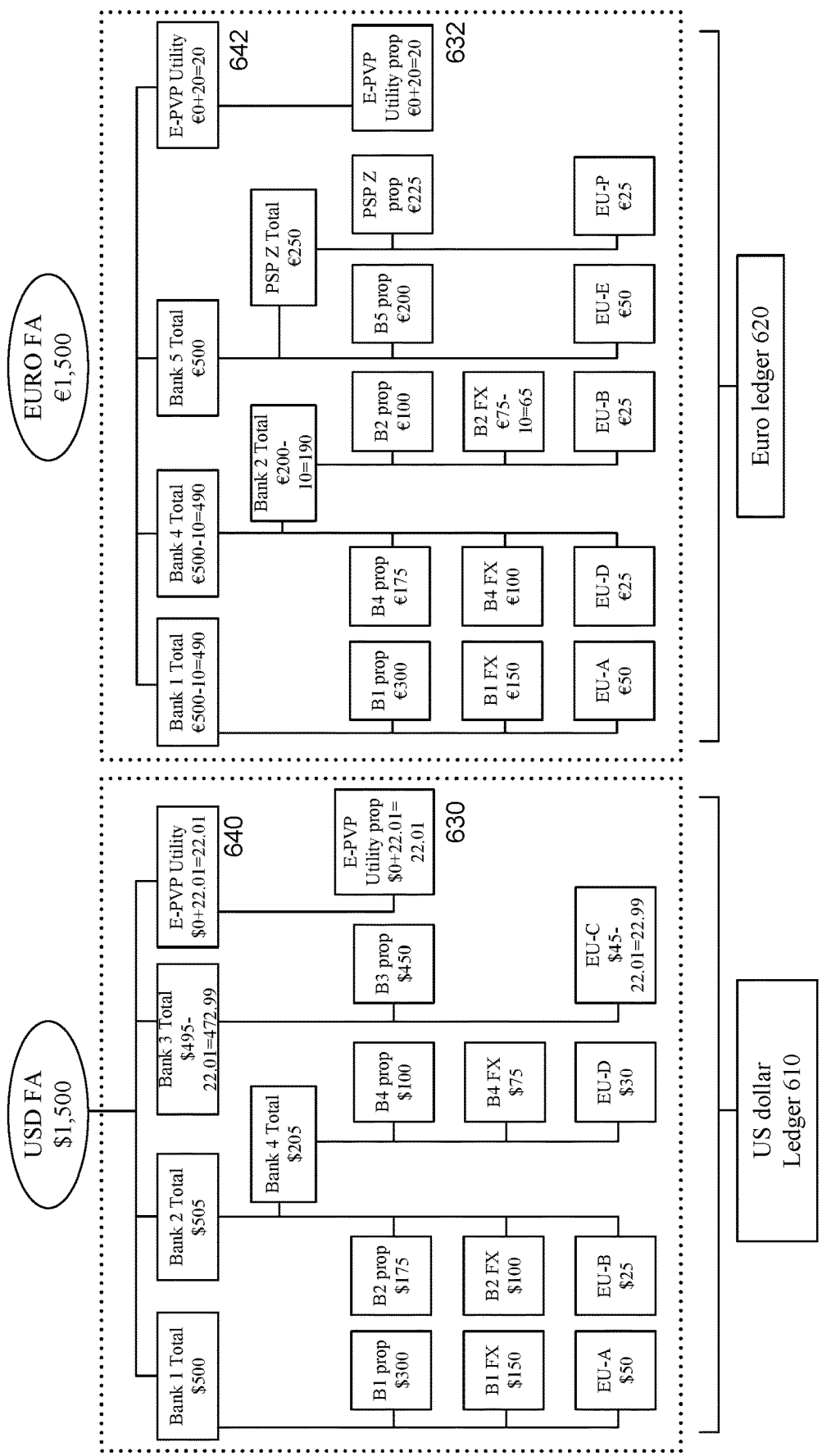

If the USD transfer from EU-C is unsuccessful, the e-PVP utility may instruct the euro ledger operator to return the transferred balances to Bank 1 and Bank 2 and restart the process. The FX trade will not be executed and the payment/transfer will not be made. FIG. 6C shows the status of both ledgers at the moment the rate is locked in and offered to EU-C.

As shown in FIG. 6C, the e-PVP Utility (shown at 630 and 632) is holding both the USD e-cash and the euro e-cash to enforce the required conditionality: either (a) the trade will be executed and settled and the €20 transfer will be made, or (b) all funds will be returned and neither the trade nor the transfer will be executed. For example, 630 may indicate e-PVP Utility prop, $0+22.01=22.01 while 632 may indicate e-PVP Utility prop, €0+20=20.

If EU-C accepts the locked-in offer within the designated timeframe (e.g., X seconds), then EU-C's acceptance triggers the simultaneous execution and settlement of the FX trade. The e-PVP utility instructs the USD ledger operator (a) to transfer $11 from the e-PVP utility proprietary sub-balance to the Bank 2 FX sub-balance; and (b) to transfer $11.01 from the e-PVP utility proprietary sub-balance to the Bank 1 FX sub-balance.

Figure 6D:
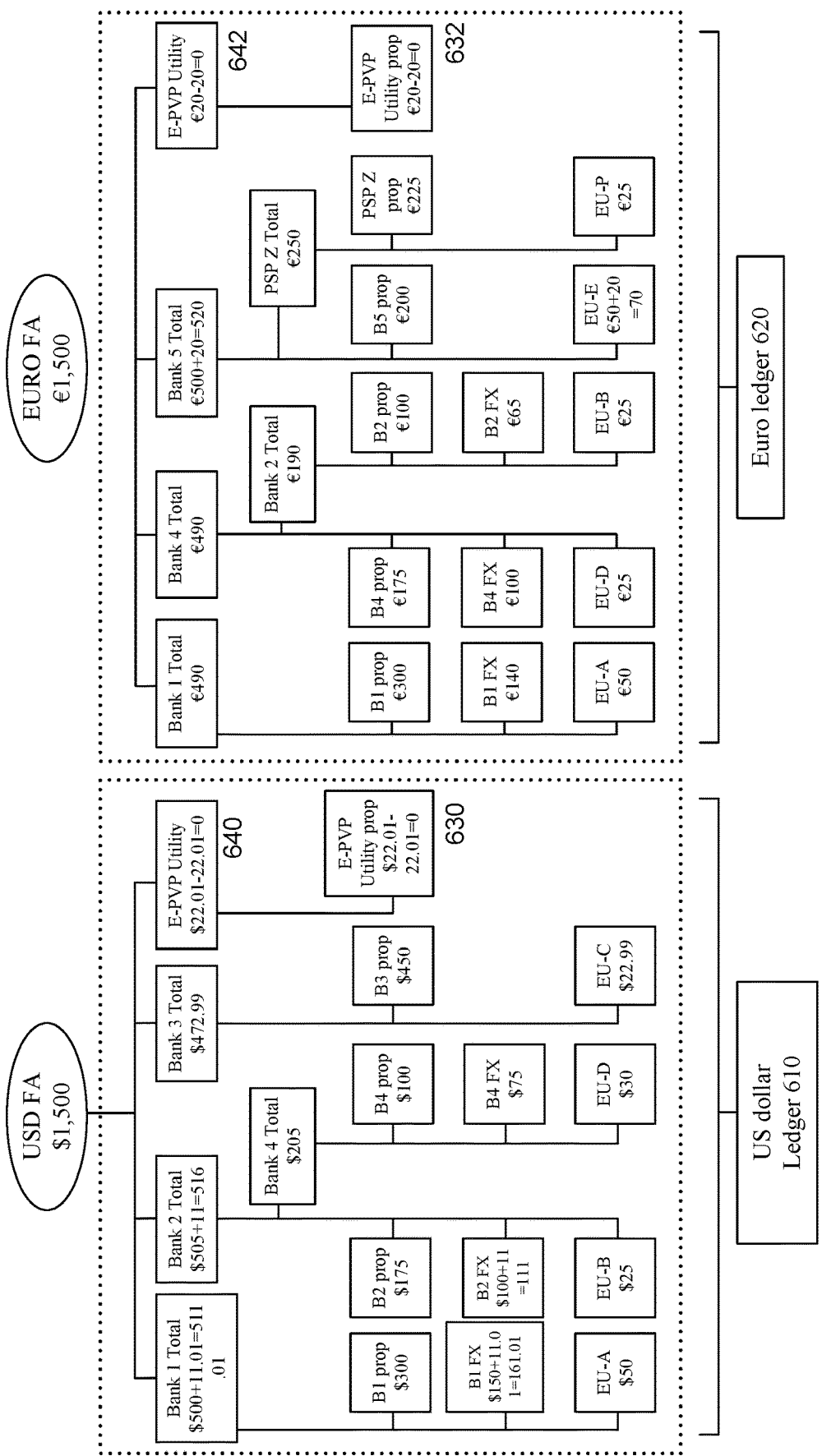

EU-C's acceptance also triggers the immediate completion of the payment. The e-PVP utility concurrently instructs the euro ledger operator to transfer €20 from the e-PVP utility proprietary sub-balance to the sub-balance associated with EU-E. If EU-C rejected the offer, or if it did not accept the offer within the designated timeframe, the e-PVP utility would (a) instruct the euro ledger operator to transfer €10 back to each of the Bank 1 and Bank 2 FX sub-balances, thereby cancelling the FX trade before it is confirmed or settled; and (b) instruct the USD ledger operator to transfer $22.01 back to the EU-C sub-balance and no payment to EU-E will be made. FIG. 6D shows the status of both ledgers after EU-C accepts the locked-in offer and the integrated process is completed.

As shown in FIG. 6D, EU-C accepts the offer and the €20 cross currency payment is completed. EU-C's acceptance of the offer to pay $22.01 to transfer exactly €20 to EU-E immediately triggered the simultaneous execution and settlement of the underlying FX trade and the completion of the transfer to EU-E. If EU-C had not accepted the offer, the FX trade would not have been executed and all previously transferred balances to the e-PVP utility would have been returned. After completion, the e-PVP Utility total balances and proprietary sub-balances return to zero. In this example, 640 may reflect "e-PVP Utility, $22.01–22.01=0" and 642 may reflect "e-PVP Utility, €20–20=0." In addition, 630 may reflect "e-PVP Utility prop, $22.01-22.01=0" and 632 may reflect "e-PVP Utility prop, €20–20=0."

In this example, EU-C, in NY, paid €20 to EU-E, in Frankfurt. From EU-C's perspective, EU-C's total assets decreased by $22.01 (e.g., its e-cash account balance at Bank 3 in New York).

From Bank 3's perspective, Bank 3's total assets decreased by $22.01 (e.g., its total balance on the USD ledger). As "compensation", Bank 3's total liabilities also decreased by $22.01 (i.e., its DDA liabilities to EU-C).

From EU-E's perspective, EU-E increased its total euro-denominated assets by €20 (i.e., its euro e-cash account balance at Bank 5 in Frankfurt).

From Bank 5's perspective, Bank 5's total liabilities increased by €20 (i.e., its DDA liabilities to EU-E). As "compensation", Bank 5's total assets also increased by €20 (i.e., its total balance on the euro ledger). Bank 5's sub-balance on the ledger associated with EU-E also increased by €20, which maintains the "100% backing" of Bank 5's guarantee of the instant 24×7 liquidity of EU-E's e-cash, which increased by €20.

From Bank 1's perspective, Bank 1's total euro assets decreased by €10 (i.e., its total balance on the euro ledger) to pay the currency it sold. As "compensation" (and to receive the currency it bought), Bank 1's total USD assets increased by $11.01 (i.e., its total balance on the USD ledger).

From Bank 2's perspective, Bank 2's total euro assets decreased by €10 (i.e., its euro DDA balance at Bank 4) to pay the currency it sold. As "compensation" (and to receive the currency it bought), Bank 2's total USD assets increased by $11 (i.e., its total balance on the USD ledger).

From Bank 4's perspective, Bank 4's total assets decreased by €10 (i.e., its total balance on the euro ledger). As "compensation", Bank 4's total liabilities decreased by €10 (i.e., its DDA liabilities to Bank 2). Moreover, EU-C in New York was able to use its USD e-cash to make a cross-border €20 payment to EU-E in Frankfurt, even though (a) EU-C maintains only a USD e-cash account at a US-based bank (Bank 3) that has no foreign correspondent banking relationships; and (b) EU-E maintains only a euro e-cash account at a German-based bank (Bank 5) that also has no foreign correspondent banking relationships.

According to another exemplary illustration of a cross-currency payment, EU-C in New York wants to pay the euro-equivalent of exactly $15 to EU-E in Frankfurt. EU-C maintains only USD-denominated DDAs, including a USD e-cash account, with Bank 3 in New York. Bank 3 has no euro correspondents. EU-E maintains only euro-denominated DDAs, including a euro e-cash account, with Bank 5 in Frankfurt. Bank 5 has no USD correspondents.

In this example, EU-C reviews the current indicative FX rates posted by the e-PVP utility. If interested, EU-C may request a "locked-in" rate from the e-PVP utility to send $15 in euro-equivalent to EU-E. If there is not an existing place/sub-balance on the ledger attributed to EU-E, the request may be denied with a message that "the payee is unknown or the payee information is incorrect: please try again". The e-PVP utility instructs the USD ledger operator to transfer $15 from the sub-balance associated with EU-C to the e-PVP utility proprietary sub-balance. If the USD transfer from EU-C is unsuccessful (e.g., due to insufficient balance), a message with the reason may be sent to EU-C and the request for a locked in rate may be denied. In this example, the transfer is successful.

The e-PVP utility then determines that the most competitive offer rate is posted by Bank 4. Bank 4 posts it is willing to sell up to €100 (out of a total euro FX sub-balance of €100) at €1=$1.1111. The e-PVP utility instructs the euro ledger operator to transfer €13.50 from the sub-balance associated with Bank 4 to the e-PVP utility proprietary sub-balance. If this transfer is unsuccessful, the e-PVP utility may restart the process. In this example, the transfer is successful. As soon as that transfer is completed, the e-PVP utility may offer EU-C a "locked" in rate of €1=$1.1111, which would allow EU-C to pay $15 and transfer €13.50 to EU-E.

Figure 6E:
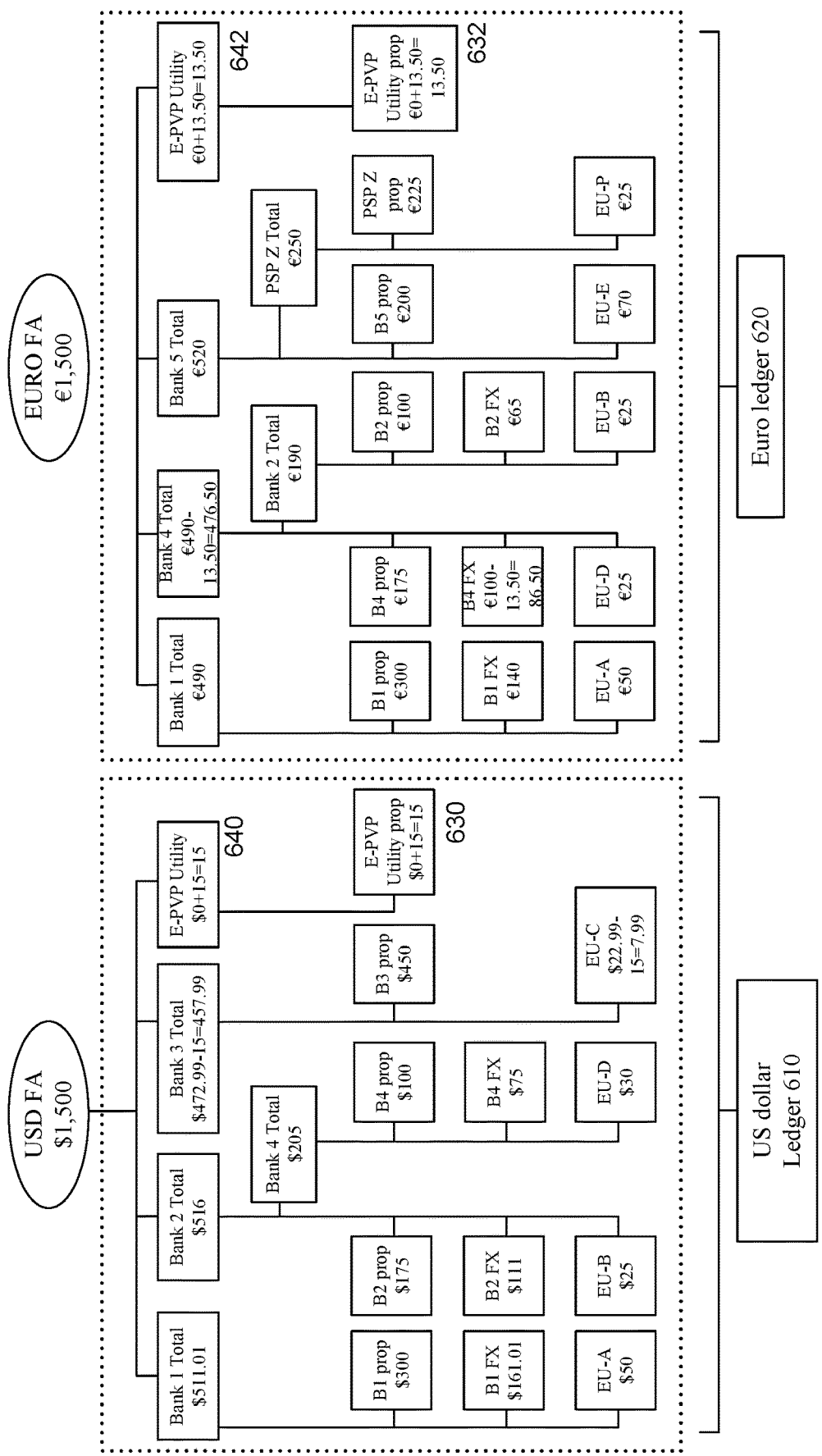

FIG. 6E illustrates the status of both ledgers at the moment the rate is locked in and offered to EU-C. In this example (as shown in FIG. 6E), the e-PVP Utility is holding both the USD e-cash and the euro e-cash to enforce the required conditionality: either (a) the trade will be executed and settled and the €13.50 transfer will be made, or (b) all funds will be returned and neither the trade nor the transfer will be executed. In this example, 640 may reflect "e-PVP Utility, $0+15=15" and 642 may reflect "e-PVP Utility, €0+13.50=13.50." In addition, 630 may reflect "e-PVP Utility prop, $0+15=0" and 632 may reflect "e-PVP Utility prop, €0+13.50=13.50."

If EU-C accepts the locked-in offer within the designated timeframe (e.g., X seconds), then: EU-C's acceptance triggers the simultaneous execution and settlement of the FX trade. The e-PVP utility may instruct the USD ledger operator to transfer $15 from the e-PVP utility proprietary sub-balance to the Bank 4 FX sub-balance. EU-C's acceptance may also trigger the immediate completion of the payment. The e-PVP utility may concurrently instruct the euro ledger operator to transfer €13.50 from the e-PVP utility proprietary sub-balance to the sub-balance associated with EU-E.

If EU-C rejected the offer, or if it did not accept the offer within the designated timeframe, the e-PVP utility may (a) instruct the euro ledger operator to transfer €13.50 back to the Bank 4 FX sub-balance, thereby cancelling the FX trade before it is confirmed or settled; and (b) instruct the USD ledger operator to transfer $15 back to the EU-C sub-balance and no transfer to EU-E will be made.

Figure 6F:
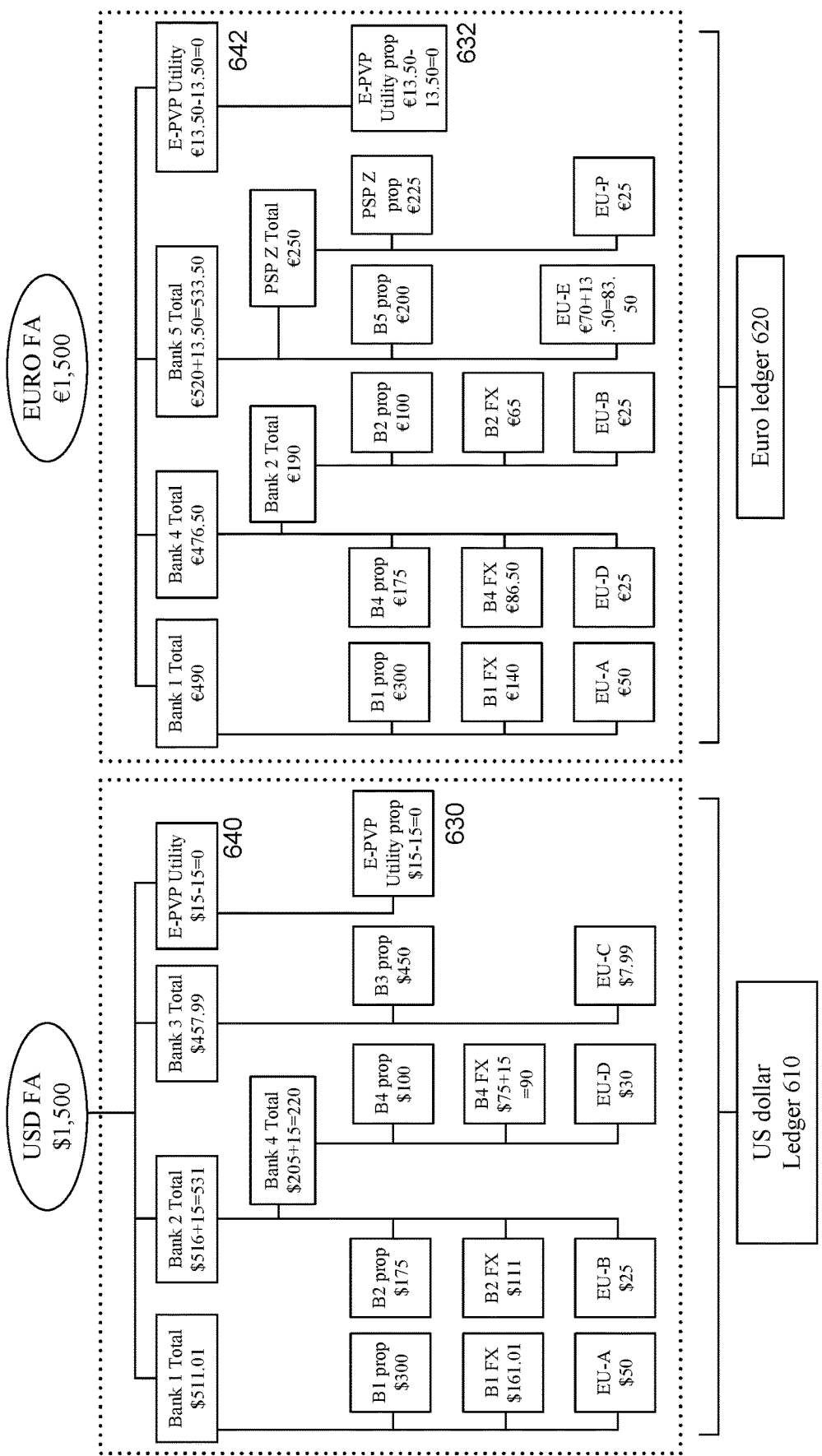

FIG. 6F illustrates the status of both ledgers after EU-C accepts the locked-in offer and the integrated process is completed. As shown in FIG. 6F, EU-C's acceptance of the offer to pay exactly $15 to transfer exactly €13.50 to EU-E may immediately trigger the simultaneous execution and settlement of the underlying FX trade and the completion of the transfer to EU-E. If EU-C had not accepted the offer, the FX trade would not have been executed and all previously transferred balances to the e-PVP utility would have been returned. After completion, the e-PVP Utility total balances and proprietary sub-balances return to zero.

In this example, 640 may reflect "e-PVP Utility, $15−15=0" and 642 may reflect "e-PVP Utility, €13.50−13.50=0." In addition, 630 may reflect "e-PVP Utility prop, $15−15=0" and 632 may reflect "e-PVP Utility prop, €13.50−13.50=0."

Figure 7A:
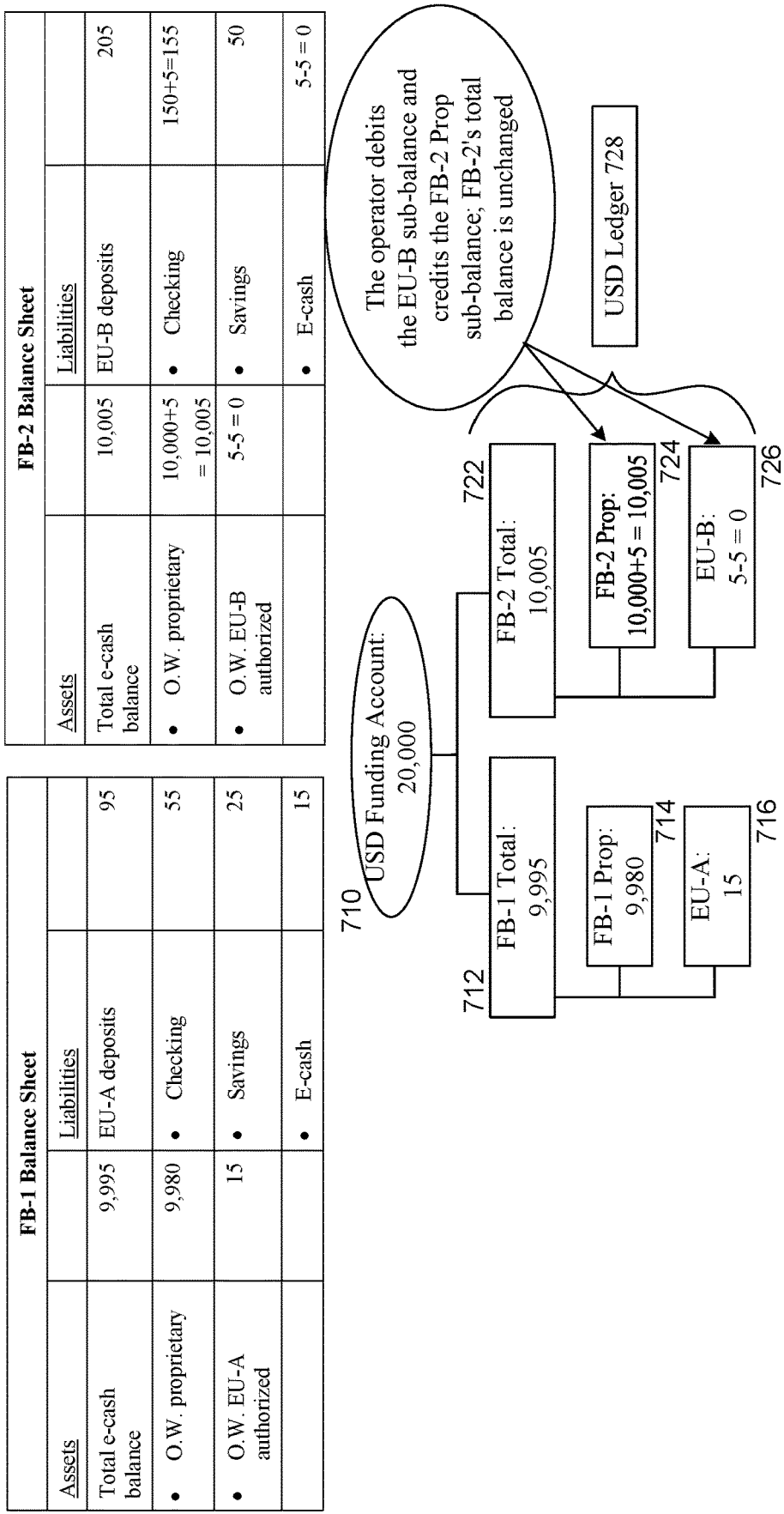
FIGS. 7A-7D are exemplary illustrations of transferring e-cash, according to an embodiment of the present invention.

FIGS. 7A-7D are exemplary illustrations of transferring e-cash, according to an embodiment of the present invention. An embodiment of the present invention is directed to converting "e-cash" into a traditional DDA balance. As shown in FIG. 7A, EU-B wishes to "deposit" or transfer, $5 of "e-cash" into its traditional checking account. This may represent a "one-time" optional transfer initiated by EU-B. It may also represent an automated sweep, voluntarily set up by EU-B or mandatorily imposed by FB-2 or the operator.

FIG. 7A is an exemplary illustration of EU-B transferring $5 in e-cash to its checking account. FIG. 7A shows FB-1 Balance Sheet and FB-2 Balance Sheet. USD Funding Account is shown by 710. Total balance of each FB on the USD ledger is shown at 712, 722. Transferable sub-balances on the USD ledger, as authorized by each FB, are shown by 714, 716, 724, and 726. USD Ledger is represented by 728. Total balances of FB-1 and FB-2 and their proprietary sub-balances are credited upon receipt of their transfers into the FA. As shown in FIG. 7A, the operator debits the EU-B sub-balance and credits the FB-2 proprietary sub-balance. FB-2's total balance is unchanged.

An embodiment of the present invention is directed to extending access to e-cash via corresponding banking. An embodiment of the present invention may be extended through correspondent banking relationships. In this example, "NFB-X" is a "non-funding bank" that wishes to participate in the arrangement. NFB-X uses FB-1 as a USD correspondent bank. "EU-C" is an end-user depositor at NFB-X with an existing checking and savings DDA.

Figure 7B:
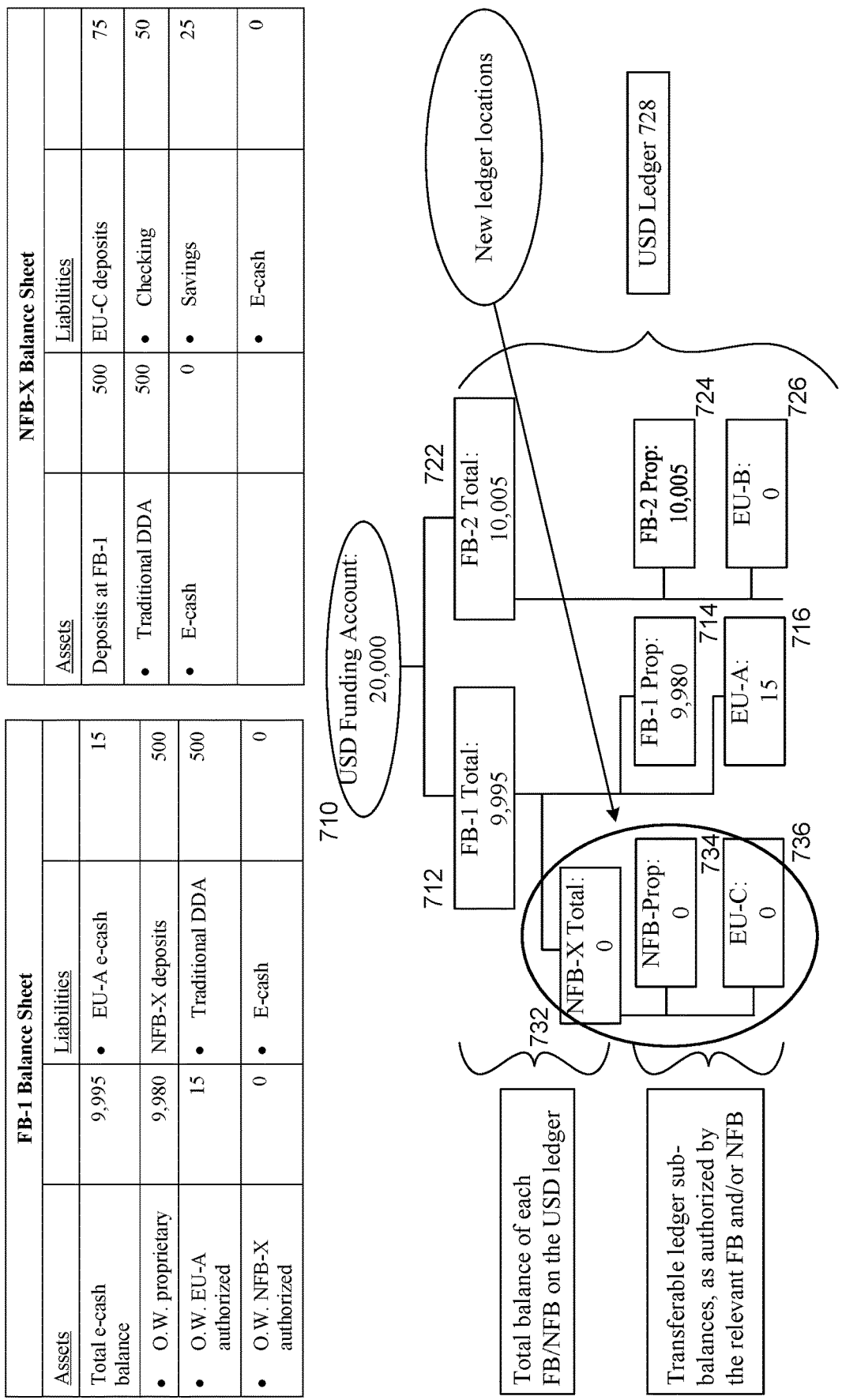

As shown in FIG. 7B, sub-balance locations on the USD ledger associated with NFB-X and EU-C have been established, each with an initial balance of "zero." FB-1 may need to authorize the establishment of a sub-balance associated with NFB-X. NFB-X (and, potentially, also FB-1, if/as required by applicable "KYC" or "KYCC" rules) may need to authorize the establishment of a sub-balance associated with EU-C.

Figure 7C:
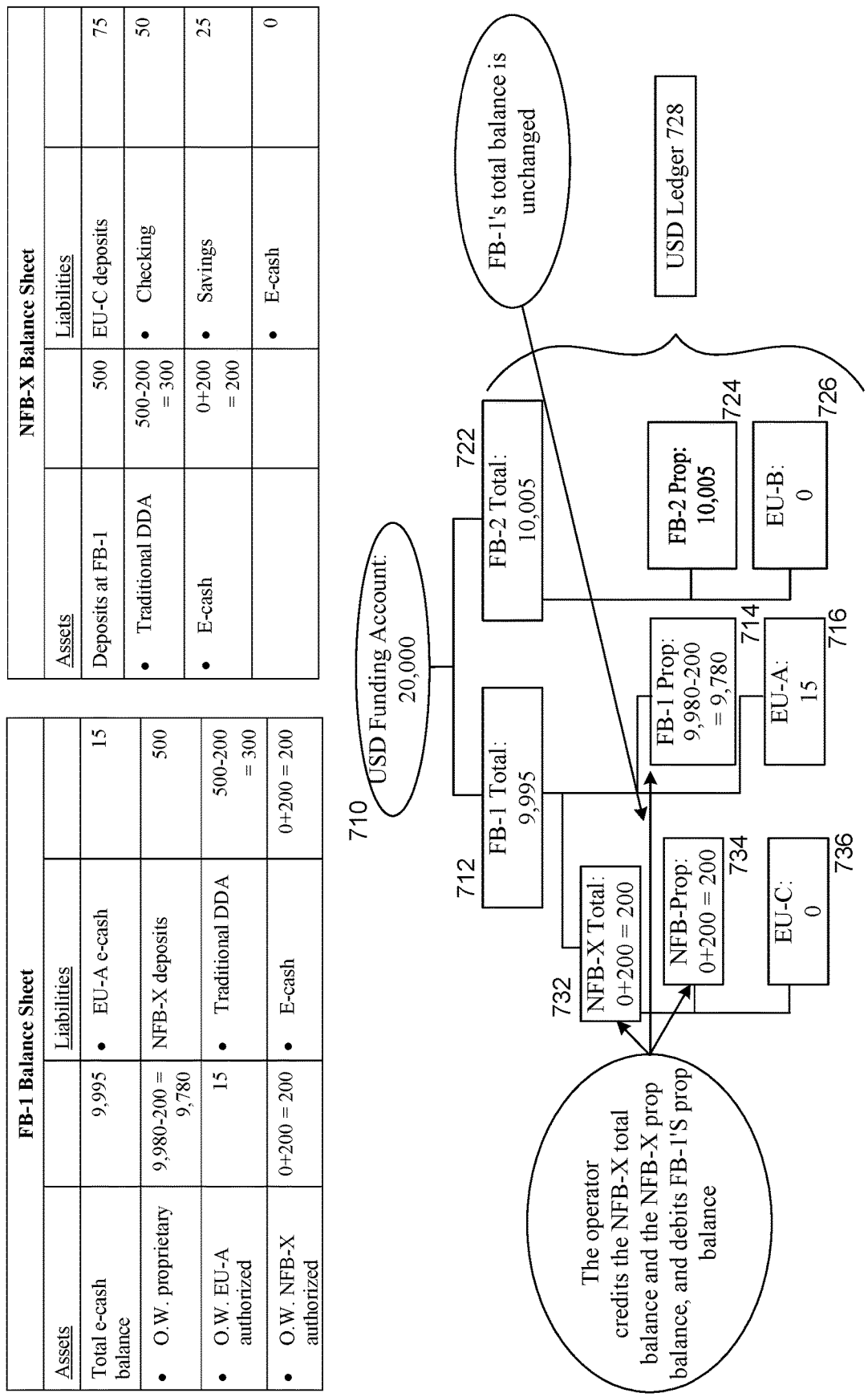
Figure 7D:
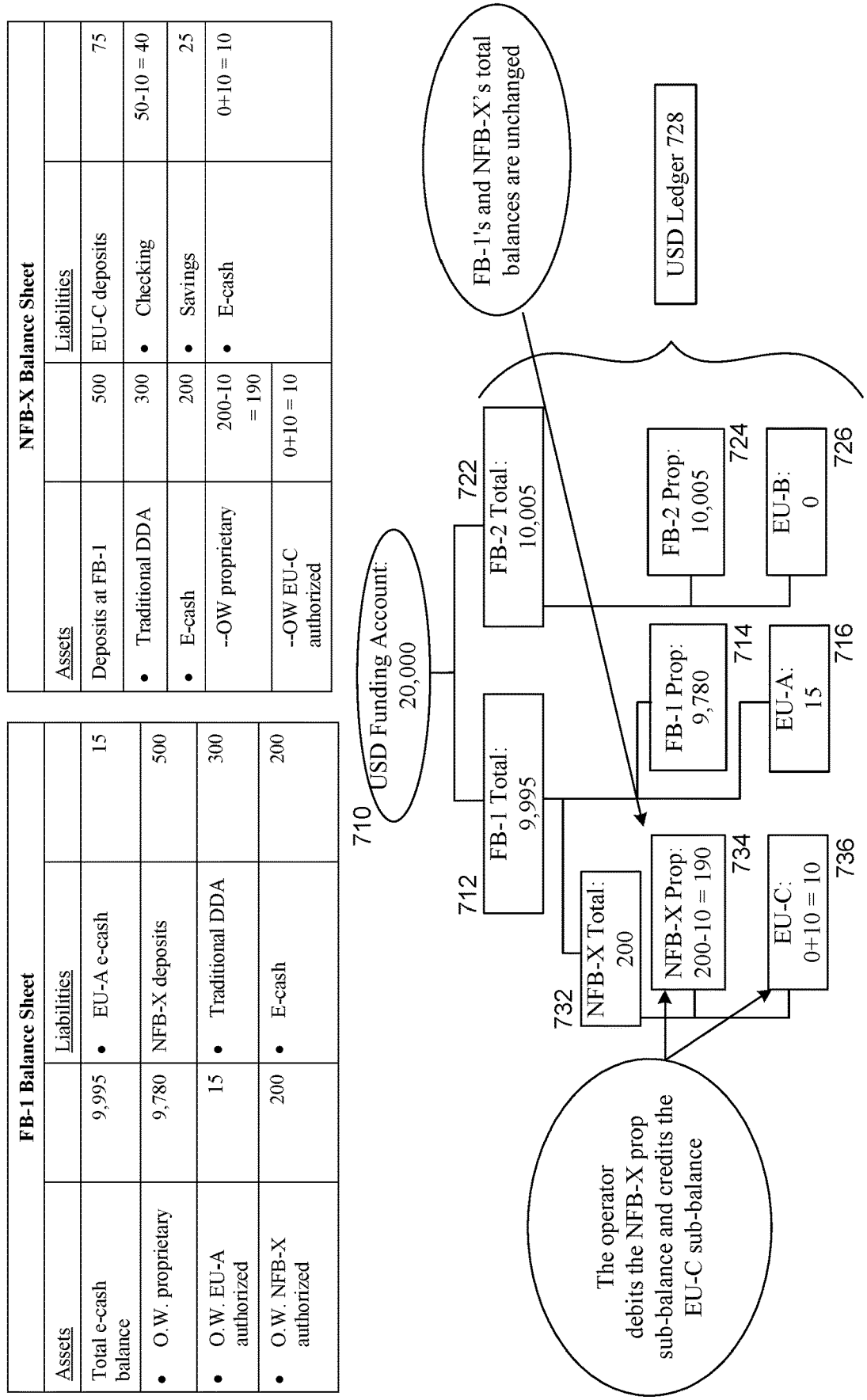

FIGS. 7B-7D show the relationship between, and the simultaneously occurring and interdependent changes to, the USD ledger and the corresponding elements of FB-1's and NFB-X's balance sheets. These relationships and the simultaneously-occurring interdependent changes may be established as legally binding via the rules of the arrangement and the terms and conditions governing FB-1's and NFB-X's respondent/correspondent relationship.

As shown in FIG. 7B, ledger sub-balances are established for NFB-X and EU-C, shown by 732, 734 and 736. FIG. 7B illustrates new ledger locations.

An embodiment of the present invention is directed to converting a traditional correspondent balance into e-cash. According to an exemplary implementation, three conditions may be required for a respondent bank to convert a "traditional" correspondent DDA balance into e-cash. First, the respondent NFB must have a sufficient available balance (or credit line) with its correspondent bank. Second, the amount to be converted must be within any daily/weekly/etc. limits as may be set by its correspondent bank. Third, its correspondent bank must have a sufficient available proprietary sub-balance on the Ledger. An embodiment of the present invention may implement a business process to ensure that each correspondent bank has a sufficient proprietary balance to meet requests for e-cash 24×7.

According to an exemplary illustration, NFB-X requests to convert $200 from its existing correspondent DDA with FB-1 (which has a $500 balance) into e-cash. This may allow NFB-X to provide up to $200 in "e-cash" to its own depositors (e.g., EU-C). In this example, the three conditions are met. If either of the first two conditions is not met, a message may be sent to NFB-X explaining why the request is denied. In the event that the third condition is not met, a message may be sent to NFB-X explaining why the request is denied (e.g., "e-cash is currently not available. Please try again shortly or contact FB-1 at XXX-XXX-XXXX"). This may also trigger a message alerting FB-1 to top up its proprietary balance.

In the example of FIG. 7C, NFB-X's request for $200 in e-cash is approved. The operator credits the NFB-X total balance and the NFB-X proprietary balance and debits FB-1's proprietary balance, as shown by 732 and 734. FB-1's total balance is unchanged.

In this example, EU-C requests $10 in e-cash. According to an exemplary embodiment, three conditions may be required for a depositor at a participating NFB to convert a "traditional" checking or savings account balance into e-cash. First, the depositor must have a sufficient available balance (or credit line) in a traditional DDA with its NFB. If this condition is satisfied. Second, the amount to be converted must be within any daily/weekly/etc. limits as may be set by its NFB (e.g., in a manner similar to limits currently placed by banks on ATM withdrawals and on electronic inter-bank transfers executed by ACH). Third, its NFB must have a sufficient available proprietary sub-balance on the ledger.

An embodiment of the present invention may implement a business process designed to ensure that each NFB will always have a sufficient proprietary balance to meet its depositors' requests for e-cash 24×7. For example, EU-C may request to convert $10 in its checking account with NFB-X into e-cash, and all three conditions are met. If either of the first two conditions is not met, a message may be sent to EU-C explaining why the request is denied. In the event that the third condition is not met, a message may be sent EU-C explaining why the request is denied (e.g., "e-cash is currently not available. Please try again shortly"). This may be comparable to a message displayed when an ATM is temporarily out of cash or out of order. This may also trigger a message alerting NFB-X to top up its proprietary balance.

As shown in FIG. 7D, the operator may debit the NFB-X proprietary sub-balance and credits the EU-C sub-balance, as shown by 734 and 736. FB-1's and NFB-X's total balances may be unchanged.

An embodiment of the present invention may be directed to holding e-cash via correspondent banking. EU-C's "e-cash" may represent an asset of EU-C. NFB-X may guarantee the instant liquidity of EU-C's e-cash. Under (a) the rules of the arrangement and (b) NFB-X's rules regarding the use of e-cash account balances on its books, EU-C may be authorized to pay/transfer its e-cash to any other e-cash account holder using the arrangement, instantly 24×7. EU-C may also transfer e-cash into its checking or savings DDA instantly 24×7.

The "sub-sub-balance" of FB-1 (under the its sub-balance for NFB-X) on the ledger associated with EU-C may serve to "back" 100%, and to deliver on, NFB-X's guarantee of the instant 24×7 liquidity of EU-C's "e-cash".

EU-C's "e-cash" may represent a direct DDA claim on NFB-X, and is intended to have the same credit risk and credit protection as the balances in EUC's traditional checking and savings accounts at NFB-X. For example, its "e-cash" can be protected by deposit insurance, if/as applicable. The e-cash account may represent a new and distinct form of DDA at NFB-X.

NFB-X's "e-cash account" balance at FB-1 is an asset of NFB-X. FB-1 guarantees the instant liquidity of NFB-X's total e-cash. Under (a) the rules of the arrangement and (b) the terms and conditions governing FB-1's and NFB-X's respondent/correspondent relationship, NFB-X and its authorized depositors associated with FB-1's respective "sub-sub-balances" are authorized to pay/transfer e-cash to any other e-cash account holder using the arrangement, instantly 24×7. NFB-X may also transfer e-cash into its traditional DDA with FB-1 instantly 24×7. NFB-X's e-cash at FB-1 is intended to have the same credit risk and credit protection as the balances in its traditional correspondent DDA at FB-1. The e-cash account may represent a new and distinct form of DDA at FB-1.

According to an exemplary embodiment, the NFB-X proprietary sub-balance has characteristics akin to "vault cash" (or "vault e-cash"). It may be thought of as the amount of "e-cash" (or "vault e-cash") that NFB-X has requested FB-1 to store in an "e-ATM" to meet any of NFB-X's depositors' requests for e-cash 24×7. In this regard, the central bank may decide to recognize the NFB-X proprietary sub-balance on the ledger (or the equivalent amount in the FA) for reserve maintenance purposes, like traditional vault cash (e.g., on a "pass through" basis via FB-1 as NFB-X's correspondent). The functioning of the prototype business processes may be independent of whether the NFB-X sub-balance (or equivalent amount in the FA) is recognized for reserve maintenance purposes.

According to an embodiment of the present invention, FB-1's total balance on the ledger represents an asset of FB-1. For example, FB-1 may have the right to transfer an equivalent amount of its total ledger balance, and an equivalent amount of any of its individual sub-balances—including those associated with NFB-X and its depositors—from the FA to its individual master account at the central bank. FB-1 may also have the right to block any further debiting of (and crediting to) any of its ledger sub-balances. For example, FB-1 may have the right to block the crediting and debiting of NFB-X's sub-balance if and when FB-1 might need to freeze or seize NFB-X's e-cash account balance (e.g., due to the same legal actions or any other conditions that might require the freezing or seizing of NFB-Xs balances in its traditional correspondent DDA at FB-1).

On a "business as usual" (BAU) basis (e.g., in the absence of any extraordinary blocking), FB-1 provides standing authorization to the operator to credit and debit each of its sub-balances associated with NFB-X and NFB-X's authorized depositors (and, equally, to credit and debit FB-1's total balance) to settle their corresponding e-cash payments/transfers.

According to an embodiment of the present invention, NFB-X may offer each of its depositors an optional automatic e-cash "replenishment" from its checking or savings account when its e-cash balance falls below a depositor-determined amount, either in "real time" or periodically (e.g., at the beginning of each day). Such replenishment may be subject to the same or similar three conditions applied to "ad hoc" requests for e-cash.

NFB-X may offer each of its depositors an optional automatic "sweep" into its checking or savings account of any e-cash balance that exceeds a depositor-determined amount, in "real time" or periodically (e.g., at the end of each day). NFB-X may impose an automatic sweep of any e-cash balance that exceeds an NFB-X-determined limit (or, if desired or required, an "operator-determined" limit), in "real time" or periodically (e.g., at the end of each day).

An embodiment of the present invention is directed to paying e-cash via correspondent banking. For example, two conditions may be required for an e-cash account holder at a NFB to pay/transfer e-cash to any other e-cash account holder. In this example, there must be a sufficient sub-balance on the ledger attributed to the payer. In addition, there must be an existing place/sub-balance on the ledger attributed to the Payee. An optional "pre-condition" may be added, if/as desired or required, to ensure that the amount does not exceed any individual transaction size limit that may be set either by NFB-X, FB-1, or by the rules of the arrangement. In the following example, EU-C wants to pay/transfer $5 to EU-B, and all conditions are met. If the first condition is not met, a message may be sent to EU-C indicating that it has insufficient e-cash in its e-cash account to complete the transaction. EU-C may then be given the option to initiate a request for additional e-cash from NFB-X. If the second condition is not met, a message may be sent along the lines that "the payee is unknown or the payee information is incorrect: please try again". Optionally, if the amount exceeds any applicable individual transaction size limit, a message may be sent to EU-C accordingly.

Figure 8A:
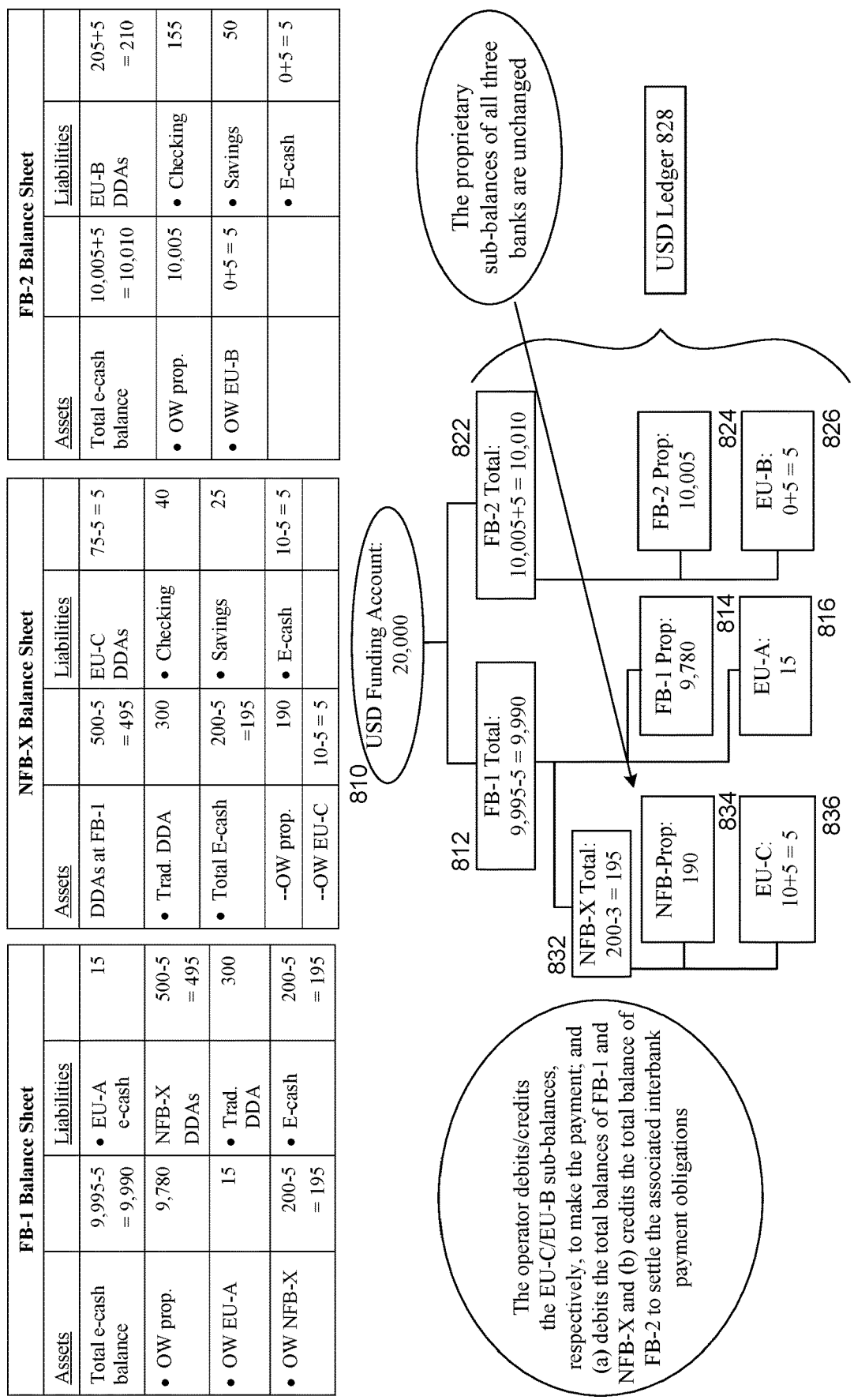
FIGS. 8A-8C are exemplary illustrations of transferring e-cash, according to an embodiment of the present invention.
Figure 8B:
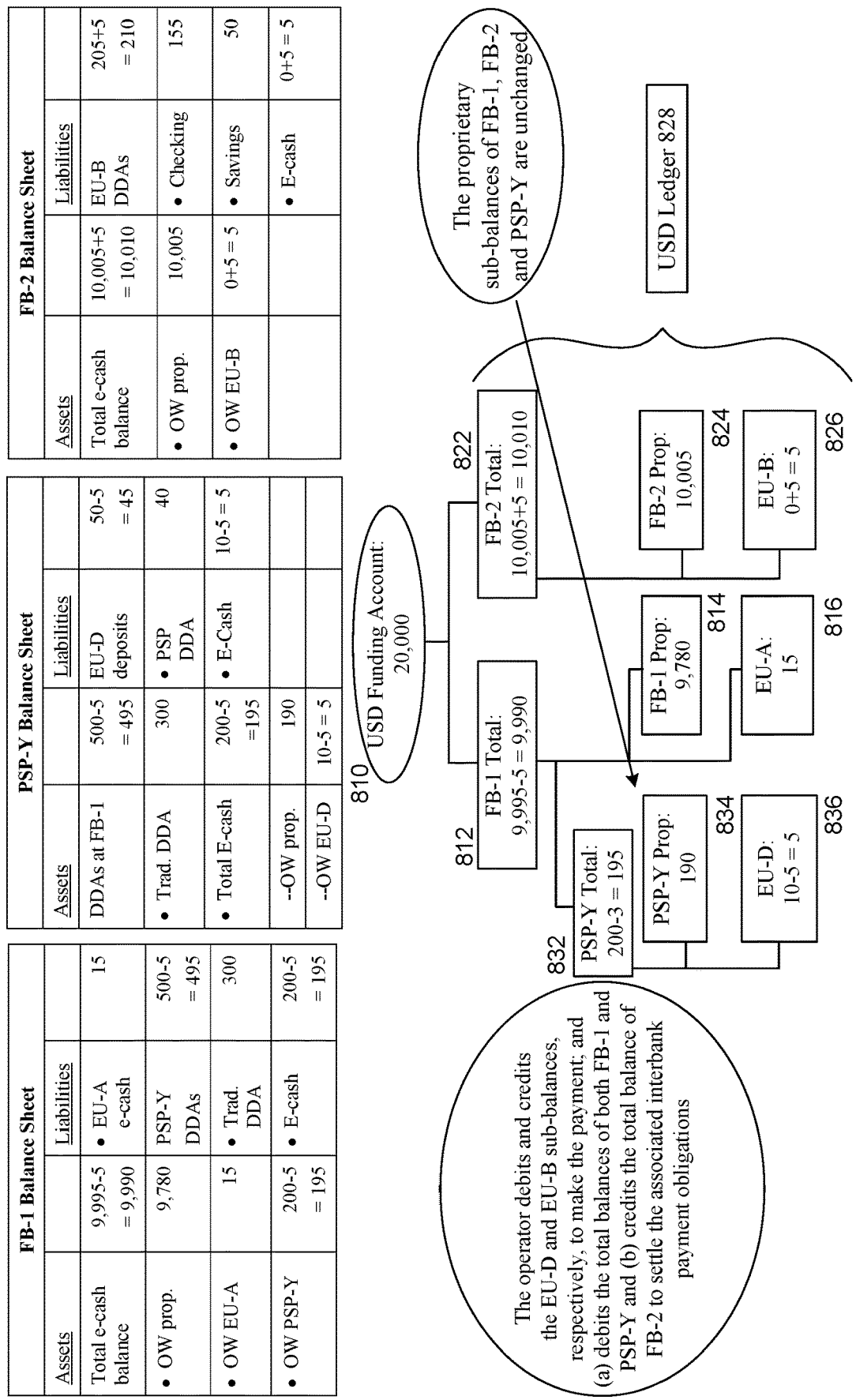
Figure 8C:
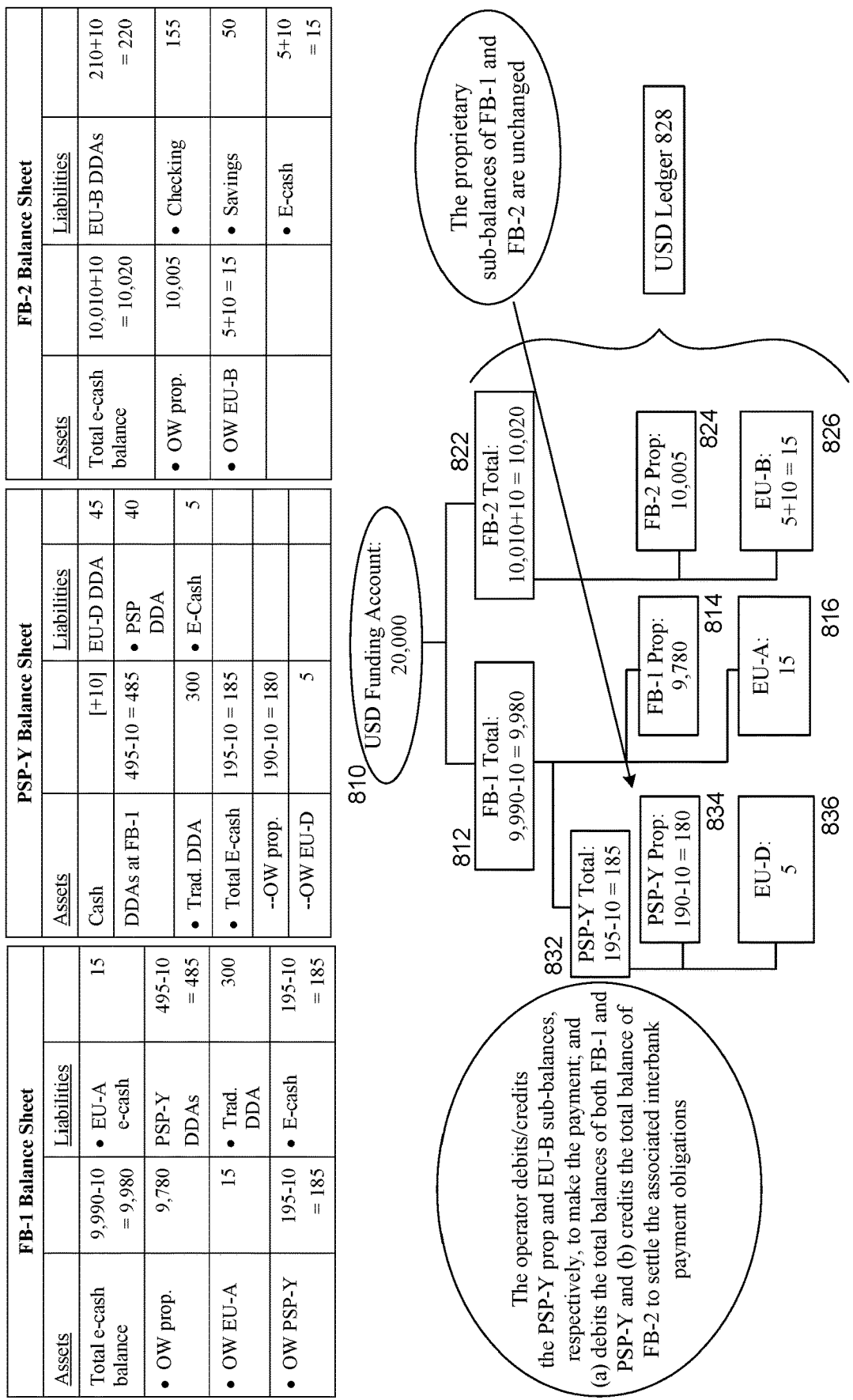

FIGS. 8A-8C are exemplary illustrations of transferring e-cash, according to an embodiment of the present invention. FIG. 8A shows EU-C's request to pay $5 to EU-B is approved. FIG. 8A shows FB-1 Balance Sheet, NFB-X Balance Sheet and FB-2 Balance Sheet. USD Funding Account is shown by 810. Total balance of each FB on the USD ledger is shown at 812, 822. Transferable sub-balances on the USD ledger, as authorized by each FB, are shown by 814, 816, 824, and 826. Ledger sub-balances are established for NFB-X and EU-C, shown by 832, 834 and 836. USD Ledger is represented by 828.

As shown in FIG. 8A, the operator debits/credits the EU-C/EU-B sub-balances, respectively, to make the payment; and (a) debits the total balances of both FB-1 and NFB-X and (b) credits the total balance of FB-2 to settle the associated interbank payment obligations. The proprietary sub-balances of all three banks may be unchanged.

From EU-C's perspective, EU-C's total assets decreased by $5 (e.g., its e-cash account balance at NFB-X).

From NFB-X's perspective, NFB-X's total assets decreased by $5 (e.g., its e-cash account at FB-1). As "compensation", NFB-X's total liabilities also decreased by $5 (e.g., its DDA liabilities to EU-C).

From FB-1's perspective, FB-1's total assets decreased by $5 (e.g., its total balance on the ledger). As "compensation", FB-1's total liabilities also decreased by $5 (e.g., its DDA liabilities to NFB-X).

From EU-B's perspective, EU-B increased its total assets by $5 (e.g., its e-cash account balance at FB-2).

From FB-2's perspective, FB-2's total liabilities increased by $5 (e.g., its DDA liabilities to EU-B). As "compensation", FB-2's total assets also increased by $5 (e.g., its total balance on the ledger). FB-2's sub-balance on the ledger associated with EU-B also increased by $5, which maintains the "100% backing" of FB-2's guarantee of the instant 24×7 liquidity of EU-B's "e-cash," which increased by $5.

From a "settlement" perspective, EU-C settled its payment obligation (or completed its desired transfer) by giving EU-B e-cash. The associated interbank payment obligations between (a) NFB-X and FB-1, and (b) FB-1 and FB-2 were simultaneously settled by (a) reducing FB-1's liabilities to NFB-X and (b) transferring FB-1's equivalent balance on the ledger to FB-2.

An embodiment of the present invention is directed to extending access to e-cash via payment service providers. An embodiment of the present invention may be extended through authorized deposit-taking payment service providers (PSPs), if and where such entities and activity are permitted. The process is essentially the same as when doing so via correspondent banks.

According to an embodiment of the present invention, FBs, NFBs, and PSPs may use their associated proprietary sub-balances on the ledger to meet requests for e-cash. With an embodiment of the present invention, the following features in various combinations may be available to every FB, NFB and PSP, if/as desired/required, to ensure its ability to meet e-cash requests 24×7.

Features may include:
Automatic alert when proprietary balance falls below a self-determined level.
Automatic alert for mandatory replenishment when proprietary balance falls below an arrangement determined level.
Automatic/voluntary operator-initiated replenishment when proprietary balance falls below a self-determined Level.
Automatic/mandatory operator-initiated replenishment when proprietary balance falls below an arrangement-determined level.
Automatic alert when any request for e-cash exceeds current proprietary balance.
Automatic/voluntary operator-initiated replenishment when a request for e-cash exceeds current proprietary balance.
Automatic/mandatory operator-initiated replenishment when a request for e-cash exceeds current proprietary balance.
Automatic alert if/when an operator-initiated replenishment is unsuccessful.
Agreed ancillary practices to facilitate borrowing/lending of proprietary balances if/when the currency's RTGS system is closed, or when automatic replenishment is unsuccessful.

An embodiment of the present invention may be directed to operator-initiated replenishment. For FBs, the operator may use NSS (whereby FBs will may authorize the operator to serve as NSS agent for this purpose) to request FRBNY to debit the master account of every FB that needs to replenish its proprietary balance, and to credit the FA with the replenishment amount(s). An FB's replenishment would be "unsuccessful" if FRBNY declines to debit that FB's master account as requested via NSS. For NFBs and PSPs, they may authorize the operator to initiate a "request for e-cash" from the NFB's/PSP's correspondent bank on their behalf, in the same manner as would the NFB/PSP itself. An NFB's/PSP's replenishment may be considered "unsuccessful" if any of the three conditions for that e-cash request are not met.

An embodiment of the present invention is directed to holding e-cash via a payment service provider. EU-D's "e-cash" may represent an asset of EU-D. PSP-Y may guarantee the instant liquidity of EU-D's e-cash. Under (a) the rules of the arrangement and (b) PSP-Y's corresponding rules regarding the use of e-cash account balances on its books, EU-D is authorized to pay/transfer its e-cash to any other e-cash account holder using the arrangement, instantly 24×7. EU-D may also transfer e-cash into its PSP DDA instantly 24×7.

The "sub-sub-balance" of FB-1 (under its sub-balance for PSP-Y) on the ledger associated with EU-D serves to "back" 100%, and to deliver on, PSP-Y's guarantee of the instant 24×7 liquidity of EU-D's "e-cash".

The balance in EU-D's e-cash account at PSP-Y is intended to have the same credit risk and credit protection as the balances in its existing PSP DDA at PSP-Y. For example, its "e-cash" can be protected by deposit insurance, if/as applicable. The e-cash account will (simply) be a new and distinct form of DDA at PSP-Y.

PSP-Y's "e-cash account" balance at FB-1 is an asset of PSP-Y. FB-1 guarantees the instant liquidity of PSP-Y's total e-cash. Under (a) the rules of the arrangement and (b) the terms and conditions governing FB-1's and PSP-Y's respondent/correspondent relationship, PSP-Y and its authorized depositors associated with FB-1's respective "sub-sub-balances" are authorized to pay/transfer e-cash to any other e-cash account holder using the arrangement, instantly 24×7. PSP-Y's e-cash at FB-1 is intended to have the same credit risk and credit protection as the balances in its traditional correspondent DDA at FB-1. The e-cash account may (simply) be a new and distinct form of DDA at FB-1.

As described previously, FB-1's total balance on the ledger represents an asset of FB-1. FB-1 may have the right to transfer an equivalent amount of its total ledger balance, and an equivalent amount of any of its individual sub-balances—including those associated with PSP-Y and its depositors—from the FA to its individual master account at the central bank. FB-1 may also have the right to block any further debiting of (and crediting to) any of its ledger sub-balances. For instance, FB-1 may have the right to block the crediting and debiting of PSP-Y's sub-balance if and when FB-1 might need to freeze or seize PSP-Y's e-cash account balance (e.g., due to the same legal actions or any other conditions that might require the freezing or seizing of PSP-Ys balances in its traditional correspondent DDA at FB-1).

On a "business as usual" (BAU) basis (e.g., in the absence of any extraordinary blocking), FB-1 provides standing authorization to the operator/arrangement to credit and debit each of its sub-balances associated with PSP-Y and PSP-Y's authorized depositors (and, equally, to credit and debit FB-1's total balance) to settle their corresponding e-cash payments/transfers.

According to an embodiment of the present invention, PSP-Y may offer each of its depositors an optional automatic e-cash "replenishment" from its PSP-DDA when its e-cash balance falls below a depositor-determined amount, in "real time" or periodically (e.g., at the beginning of each day). Such replenishment may be subject to the same or similar three conditions applied to "ad hoc" requests for e-cash. PSP-Y may offer each of its depositors an optional automatic "sweep" into its PSP DDA of any e-cash balance that exceeds a depositor-determined amount, in "real time" or periodically (e.g., at the end of each day). PSP-Y may impose an automatic sweep of any e-cash balance that exceeds a PSP-Y-determined limit (or, if desired or required, an "operator-determined" limit), in "real time" or periodically (e.g., at the end of each day).

An embodiment of the present invention is directed to paying e-cash via a payment provider. According to an exemplary illustration, two conditions must be met for an e-cash account holder at a PSP to pay/transfer e-cash to any other e-cash account holder. First, there must be a sufficient sub-balance on the ledger attributed to the payer. Second, there must be an existing place/sub-balance on the ledger attributed to the payee. An optional "pre-condition" may be added, if/as desired or required, to ensure that the amount does not exceed any individual transaction size limit that may be set either by PSP-Y, by FB-1, or by the rules of the arrangement.

According to an exemplary illustration, EU-D wants to pay/transfer $5 to EU-B, and all conditions are met. If the first condition is not met, a message may be sent to EU-D indicating that it has insufficient e-cash in its e-cash account to complete the transaction. EU-D may then be given the option to initiate a request for additional e-cash from PSP-Y. If the second condition is not met, a message may be sent along the lines that "the payee is unknown or the payee information is incorrect: please try again." In addition, if the amount exceeds any applicable individual transaction size limit, a message may be sent to EU-C accordingly.

In FIG. 8B, EU-D's request to pay $5 to EU-B is approved. The operator debits and credits the EU-D and EU-B sub-balances, respectively, to make the payment; and (a) debits the total balances of both FB-1 and PSP-Y and (b) credits the total balance of FB-2 to settle the associated interbank payment obligations. The proprietary sub-balances of FB-1, FB-2 and PSP-Y may be unchanged.

From EU-D's perspective, EU-D's total assets decreased by $5 (i.e., its e-cash account balance at PSP-Y).

From PSP-Y's perspective, PSP-Y's total assets decreased by $5 (i.e., its e-cash account at FB-1). As "compensation", PSP-Y's total liabilities also decreased by $5 (i.e., its DDA liabilities to EU-D).

From FB-1's perspective, FB-1's total assets decreased by $5 (i.e., its total balance on the ledger). As "compensation", FB-1's total liabilities also decreased by $5 (i.e., its DDA liabilities to PSP-Y).

From EU-B's perspective, EU-B increased its total assets by $5 (i.e., its e-cash account balance at FB-2).

From FB-2's perspective, FB-2's total liabilities increased by $5 (i.e., its DDA liabilities to EU-B). As "compensation", FB-2's total assets also increased by $5 (i.e., its total balance on the ledger). FB-2's sub-balance on the ledger associated with EU-B also increased by $5, which maintains the "100% backing" of FB-2's guarantee of the instant 24×7 liquidity of EU-B's "e-cash," which increased by $5.

From a "settlement" perspective, EU-D settled its payment obligation (or completed its desired transfer) by giving EU-B e-cash. The associated interbank payment obligations between (a) PSP-Y and FB-1, and (b) FB-1 and FB-2 were simultaneously settled by (a) reducing FB-1's liabilities to PSP-Y and (b) transferring FB-1's equivalent balance on the ledger to FB-2.

According to an embodiment of the present invention, a PSP may send e-cash as a money transmitter. A PSP can use the arrangement to make an e-cash transfer on behalf of a "walk in" customer to any other e-cash account holder (e.g., to act as a "money transmitter") instantly 24×7.

As shown in FIG. 8C, PSP-Y may use the arrangement to pay $10 to EU-B on behalf of a "walk-in" customer. In this example, the walk-in customer may pay PSP-Y $10, plus any fee PSP-Y may charge, via whatever means of payment PSP-Y currently accepts when functioning as a money transmitter.

In FIG. 8C, the operator debits/credits the PSP-Y proprietary and EU-B sub-balances, respectively, to make the payment; and (a) debits the total balances of both FB-1 and PSP-Y and (b) credits the total balance of FB-2 to settle the associated interbank payment obligations. The proprietary sub-balances of FB-1 and FB-2 may be unchanged.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented system that implements a payment architecture that provides instant payment in digital cash, the computer implemented system comprising:
   a central bank interface that communicates via a communication network with a central bank and manages a plurality of funding accounts held by one or more of a plurality of funding banks in their individual capacity and a plurality of funding banks together in a joint capacity, the funding accounts holding assets sufficient to back an e-cash currency allocated to each of the respective funding banks, wherein each of the one or more funding banks hold separate funding accounts on a per currency basis;
   a digital e-cash ledger that is stored in a memory component and comprises a data structure, the digital e-cash ledger reflects a total e-cash issued from the central bank to the plurality of funding banks as well as an accounting of e-cash movement into and out of each of the plurality of funding banks and into and out of specific subaccounts within each of the plurality of funding banks, the subaccounts comprising one or more of a plurality of end user accounts, payment service providers, and non-funding banks, the non-funding banks and payment service providers further comprising a plurality of end user accounts, wherein there is a separate account of e-cash on a per currency basis;

a computer processor that is programed to manage a funding account and execute a ledger operator module that ensures alignment between the funding account and the digital e-cash ledger, and further effects transactions and adjustments on the digital cash ledger; the computer processor is further programmed to perform the steps of:

electronically receiving a request from a payer directly or via an e-cash account provider for the payer holding one of the plurality of end user accounts to convert a portion of the payer's end user account from a traditional deposit balance into e-cash;

verifying (1) the payer has sufficient funds for the requested e-cash conversion, (2) the requested e-cash conversion is within one or more set limits on e-cash conversion activity, and (3) the e-cash account provider for the payer's end user account has a sufficient proprietary e-cash sub-balance on the digital e-cash ledger;

converting the payer's end user account based on the received conversion request and updating the digital e-cash ledger to reflect the addition of e-cash in the payer's end user account and a deduction in an equal amount from the respective e-cash account provider's proprietary e-cash sub-balance;

electronically receiving a transaction request from the payer directly or via the e-cash account provider for the payer to a payee holding one of the plurality of end user accounts;

verifying an available e-cash balance in the end user account of the payer for the transaction request prior to making a payment pursuant to the transaction request;

checking an instruction associated with the transaction request against one or more predetermined limits; and automatically and simultaneously adjusting the digital e-cash ledger for end user balances of the payer and the payee, as well as the corresponding balances of the relevant funding banks, non-funding banks, and payment service providers based on the transaction request, where the payment amount is deducted from the e-cash amount in the payer's end user balance as well as the relevant funding banks', non-funding banks', and payment service providers' total amount of e-cash, and the payment amount is added to the payee's end user balance in e-cash as well as the relevant funding banks', non-funding banks', and payment service providers' total amount of e-cash.

2. The system of claim 1, wherein the predetermined limits are imposed by a funding bank.

3. The system of claim 1, wherein the predetermined limits are imposed by the central bank.

4. The system of claim 1, wherein a digital cash deposit account holds the digital cash, the digital cash deposit account is distinct and different from an existing direct deposit account (DDA).

5. The system of claim 1, wherein the payment request is received via a mobile device.

6. The system of claim 1, further comprising:

an e-Payment Versus Payment ("e-PVP") utility that matches a payment request to quoted rates from one or more foreign exchange traders.

7. The system of claim 6, wherein an e-PVP utility operator issues transfer instructions to currency ledger operators directly or via the payer's e-cash account provider and an FX trader, respectively, to lock in a foreign currency exchange rate and to execute an integrated tri-party transaction among the payer, payee and FX trader to effect a cross-currency payment.

8. The system of claim 7, where the computer processor is further programmed to perform the step of:

receiving one or more rate quotes from a foreign exchange trader.

9. The system of claim 8, wherein an end user accepts directly or via an e-cash account provider for the user at least one rate quote to execute and settle the integrated tri-party transaction to effect a cross-currency payment.

10. The system of claim 8, wherein an end user rejects directly or via an e-cash account provider for the user at least one rate quote and the corresponding funds are returned.

11. A computer implemented method that implements a payment architecture that provides instant payment in digital cash, the computer implemented method comprising the steps of:

communicating, via a central bank interface and a communication network, with a central bank to manage a plurality of funding accounts held by one or more of a plurality of funding banks in their individual capacity and a plurality of funding banks together in a joint capacity, the funding accounts holding assets sufficient to back an e-cash currency allocated to each of the respective funding banks, wherein each of the one or more funding banks hold separate funding accounts on a per currency basis;

storing, via a memory component, a digital e-cash ledger that comprises a data structure, the digital e-cash ledger reflects a total e-cash issued from the central bank to the plurality of funding banks as well as an accounting of e-cash movement into and out of each of the plurality of funding banks and into and out of specific subaccounts within each of the plurality of funding banks, the subaccounts comprising one or more of a plurality of end user accounts, payment service providers, and non-funding banks, the non-funding banks and payment service providers further comprising a plurality of end user accounts, wherein there is a separate account of e-cash on a per currency basis;

managing, via a computer processor, a funding account and executing, via the computer processor, a ledger operator module that ensures alignment between the funding account and the digital e-cash ledger, and further effects transactions and adjustments on the digital e-cash ledger;

electronically receiving a request from a payer directly or via an e-cash account provider for the payer holding one of the plurality of end user accounts to convert a portion of the payer's end user account from a traditional deposit balance into e-cash;

verifying (1) the payer has sufficient funds for the requested e-cash conversion, (2) the requested e-cash conversion is within one or more set limits on e-cash conversion activity, and (3) the e-cash account provider for the payer's end user account has a sufficient proprietary e-cash sub-balance on the digital e-cash ledger;

converting the payer's end user account based on the received conversion request and updating the digital e-cash ledger to reflect the addition of e-cash in the payer's end user account and a deduction in an equal amount from the respective e-cash account provider's proprietary e-cash sub-balance;

electronically receiving a transaction request from the payer directly or via the e-cash account provider for the payer to a payee holding one of the plurality of end user accounts;

verifying, via the computer processor, an available e-cash balance in the end user account of the payer account of the payer for the transaction request prior to making a payment pursuant to the transaction request;

checking, via the computer processor, an instruction associated with the transaction request against one or more predetermined limits; and automatically and simultaneously adjusting, via the computer processor, the digital e-cash ledger for end user balances of the payer and the payee, as well as the corresponding balances of the relevant funding banks, non-funding banks, and payment service providers based on the transaction request, where the payment amount is deducted from the e-cash amount in the payer's end user balance as well as the relevant funding banks', non-funding banks', and payment service providers' total amount of e-cash, and the payment amount is added to the payee's end user balance in e-cash as well as the relevant funding banks', non-funding banks', and payment service providers' total amount of e-cash.

12. The method of claim 11, wherein the predetermined limits are imposed by a funding bank.

13. The method of claim 11, wherein the predetermined limits are imposed by the central bank.

14. The method of claim 11, wherein a digital cash deposit account holds the digital cash, the digital cash deposit account is distinct and different from an existing direct deposit account (DDA).

15. The method of claim 11, wherein the payment request is received via a mobile device.

16. The method of claim 11, further comprising the step of:
matching, via an e-PVP utility, a payment request to quoted rates from one or more foreign exchange traders.

17. The method of claim 16, wherein an e-PVP utility issues transfer instructions to currency ledger operators directly or via the payer's e-cash account provider and an FX trader, respectively, to lock in a foreign currency exchange rate and to execute an integrated tri-party transaction among the payer, payee and FX trader to effect a cross-currency payment.

18. The method of claim 17, further comprising the step of:
receiving, via the computer processor, one or more rate quotes from a foreign exchange trader.

19. The method of claim 18, wherein an end user accepts directly or via an e-cash account provider for the user at least one rate quote to execute and settle the integrated tri-party transaction to effect a cross-currency payment.

20. The method of claim 18, wherein an end user rejects directly or via an e-cash account provider for the user at least one rate quote and the corresponding funds are returned.

* * * * *